(12) United States Patent
Wu et al.

(10) Patent No.: US 11,854,232 B2
(45) Date of Patent: *Dec. 26, 2023

(54) SYSTEMS AND METHODS FOR PATIENT POSITIONING

(71) Applicant: SHANGHAI UNITED IMAGING INTELLIGENCE CO., LTD., Shanghai (CN)

(72) Inventors: Ziyan Wu, Cambridge, MA (US); Srikrishna Karanam, Cambridge, MA (US)

(73) Assignee: SHANGHAI UNITED IMAGING INTELLIGENCE CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/651,808

(22) Filed: Feb. 20, 2022

(65) Prior Publication Data
US 2022/0172398 A1 Jun. 2, 2022

Related U.S. Application Data

(63) Continuation of application No. 16/656,511, filed on Oct. 17, 2019, now Pat. No. 11,288,841.

(51) Int. Cl.
*G06T 7/73* (2017.01)

(52) U.S. Cl.
CPC .............. *G06T 7/75* (2017.01); *G06T 7/74* (2017.01); *G06T 2207/10024* (2013.01);
(Continued)

(58) Field of Classification Search
CPC ... G06T 7/75; G06T 7/74; G06T 2207/10024; G06T 2207/10028; G06T 2207/20081;
(Continued)

(56) References Cited

U.S. PATENT DOCUMENTS 6,345,110 B1 * 2/2002 Niyogi ................. G06V 40/164
382/226
9,159,134 B2 * 10/2015 Martinetz ............... G06T 7/251
(Continued)

FOREIGN PATENT DOCUMENTS

CN 109902659 A 6/2019

OTHER PUBLICATIONS

Zhang, Yuting, et al. "Unsupervised discovery of object landmarks as structural representations." Proceedings of the IEEE Conference on Computer Vision and Pattern Recognition. 2018. (Year: 2018).*
(Continued)

*Primary Examiner* — Andrae S Allison
(74) *Attorney, Agent, or Firm* — METIS IP LLC

(57) ABSTRACT

A system for patient positioning is provided. The system may acquire image data relating to a patient holding a posture and a plurality of patient models. Each patient model may represent a reference patient holding a reference posture, and include at least one reference interest point of the referent patient and a reference representation of the reference posture. The system may also identify at least one interest point of the patient from the image data using an interest point detection model. The system may further determine a representation of the posture of the patient based on a comparison between the at least one interest point of the patient and the at least one reference interest point in each of the plurality of patient models.

20 Claims, 11 Drawing Sheets

(52) U.S. Cl.
CPC ............... *G06T 2207/10028* (2013.01); *G06T 2207/20081* (2013.01); *G06T 2207/30004* (2013.01); *G06T 2207/30196* (2013.01)

(58) Field of Classification Search
CPC . G06T 2207/30004; G06T 2207/30196; G06T 2207/10072; G06T 2207/10116; G06T 2207/10132; G06T 2207/20084; G06T 7/73; G16H 20/00; G06V 10/25
See application file for complete search history.

(56) References Cited

U.S. PATENT DOCUMENTS

| | | | |
|---|---|---|---|
| 9,479,354 B2 | 10/2016 | Yamanishi et al. | |
| 10,127,659 B2 | 11/2018 | Hsieh et al. | |
| 11,288,841 B2* | 3/2022 | Wu | G06T 7/75 |
| 11,367,195 B2* | 6/2022 | Lv | G06T 7/11 |
| 2010/0215271 A1* | 8/2010 | Dariush | G06V 40/103 |
| | | | 382/180 |
| 2011/0267344 A1* | 11/2011 | Germann | G06V 20/64 |
| | | | 382/154 |
| 2015/0202492 A1 | 7/2015 | Domansky et al. | |
| 2016/0306924 A1 | 10/2016 | Singh et al. | |
| 2017/0014648 A1* | 1/2017 | Mostafavi | G06T 7/74 |
| 2018/0144466 A1 | 5/2018 | Hsieh et al. | |
| 2019/0122380 A1 | 4/2019 | Cao et al. | |
| 2019/0147292 A1* | 5/2019 | Watanabe | G06V 10/40 |
| | | | 382/103 |
| 2019/0180473 A1* | 6/2019 | Guleryuz | G06T 5/002 |
| 2020/0105014 A1* | 4/2020 | Agnihotram | G06T 7/75 |
| 2020/0167947 A1 | 5/2020 | Okazaki | |
| 2020/0375546 A1* | 12/2020 | Shoudy | A61B 5/7425 |
| 2021/0248355 A1 | 8/2021 | Wang et al. | |

OTHER PUBLICATIONS

Chen et al Patient-Specific Pose Estimation in Clinical Environments. IEEE J Transl Eng Health Med. Oct. 10, 2018;6:2101111. doi: 10.1109/JTEHM.2018.2875464. PMID: 30483453; PMC (Year: 2018).*

Zhang, Yuting et al., Unsupervised Discovery of Object Landmarks as Structural Representations, 2018 IEEE/CVF Conference on Computer Vision and Pattern Recognition, 2694-2703, 2018.

Chen, Chinghang et al., 3D Human Pose Estimation = 2D Pose Estimation + Matching, 2017 IEEE Conference on Computer Vision and Pattern Recognition (CVPR), 5759-5767, 2017.

Xu, Yifeng et al., Human Posture Recognition and fall detection Using Kinect V2 Camera, 2019 Chinese Control Conference (CCC), 8488-8493, 2019.

* cited by examiner

800

```
┌─────────────────────────────────────────────────────────────┐  801
│ For each training sample, identifying, from the corresponding│
│ sample image data, a plurality of first candidate interest   │
│ points of the corresponding sample patient using a preliminary│
│ model in a current iteration                                 │
└─────────────────────────────────────────────────────────────┘
                            │
                            ▼
┌─────────────────────────────────────────────────────────────┐  802
│ For each training sample, generating transformed image data │
│           of the corresponding sample patient               │
└─────────────────────────────────────────────────────────────┘
                            │
                            ▼
┌─────────────────────────────────────────────────────────────┐  803
│ For each training sample, identifying, from the corresponding│
│ transformed image, a plurality of second candidate interest │
│ points corresponding to the first candidate interest points │
└─────────────────────────────────────────────────────────────┘
                            │
                            ▼
┌─────────────────────────────────────────────────────────────┐  804
│ Determining, based on the first candidate interest points and│
│ the second candidate interest points of each training sample,│
│              a value of a second loss function              │
└─────────────────────────────────────────────────────────────┘
                            │
                            ▼
                   ╱─────────────────╲  805
         No       ╱  Is a second      ╲
      ◄──────────⟨  termination        ⟩
                  ╲ condition satisfied╱
                   ╲ in the current   ╱
                    ╲  iteration?    ╱
                     ╲──────────────╱
                            │ Yes
                            ▼
┌─────────────────────────────────────────────────────────────┐  806
│ Designing the preliminary model in the current iteration as │
│          the interest point detection model                 │
└─────────────────────────────────────────────────────────────┘
                                                                807
┌─────────────────────────────────────────────────────────────┐
│ Updating the preliminary model in the current iteration, and│
│  designing the updated preliminary model in the current     │
│    iteration as a preliminary model in a next iteration     │
└─────────────────────────────────────────────────────────────┘
```

FIG. 8

SYSTEMS AND METHODS FOR PATIENT POSITIONING

CROSS-REFERENCE TO RELATED APPLICATIONS

This application is a continuation of U.S. patent application Ser. No. 16/656,511, filed on Oct. 17, 2019, the entire contents of which are hereby incorporated by reference.

TECHNICAL FIELD

The present disclosure generally relates to patient positioning, and more particularly, relates to systems and methods for determining a posture representation of a patient.

BACKGROUND

Patient positioning is vital to accurate and safe clinical examinations and/or treatment. For example, in a radiotherapy treatment on a cancer patient, a patient needs to hold a planned posture, for example, be placed accurately at a planned position holding a planned pose, in order to reduce toxicity to portions of the patient by unintended radiation, and improve targeting of the target and overall outcome of the treatment. In order to ensure accurate positioning of the patient, the actual posture of the patient may be compared with the planned posture to identify set-up errors of the patient. Thus, it may be desirable to develop systems and methods for determining a representation that quantitatively describes the posture of a patient, thereby improving the positioning accuracy.

SUMMARY

According to one aspect of the present disclosure, a system for patient positioning is provided. The system may include at least one storage medium including a set of instructions, and at least one processor configured to communicate with the at least one storage device. When executing the instructions, the at least one processor may be configured to direct the system to perform the following operations. The at least one processor may be configured to direct the system to acquire image data relating to a patient holding a posture, and identify one or more interest points of the patient from the image data using an interest point detection model. The at least one processor may be also configured to direct the system to acquire a plurality of patient models. Each patient model may represent a reference patient holding a reference posture, and include one or more reference interest points of the referent patient and a reference representation of the reference posture. The at least one processor may be further configured to direct the system to determine a representation of the posture of the patient based on a comparison between the at least one interest point of the patient and the at least one reference interest point in each of the plurality of patient models.

In some embodiments, to determine a representation of the posture of the patient, the at least one processor may be configured to direct the system to, for each of the patient models, determine a matching degree between the patient and the patient model based on the at least one reference interest point in the patient model and the at least one interest point of the patient. The at least one processor may be further configured to direct the system to select a patient model that has a highest matching degree with the patient among the patient models, and designate the reference representation corresponding to the selected patient model as the representation of the posture of the patient.

In some embodiments, the at least one processor may be configured to direct the system to obtain a plurality of training samples. Each training sample may include sample image data of a sample patient holding a posture and a representation of the posture of the sample patient. The at least one processor may be also configured to direct the system to obtain a preliminary model, and generate the interest point detection model by training the preliminary model using the training samples.

In some embodiments, the sample image data of each training sample may have no annotation regarding interest points on the corresponding sample patient.

In some embodiments, for each of the reference patients, the at least one processor may be configured to direct the system to obtain reference image data of the reference patient holding a reference posture. For each of the reference patients, the at least one processor may be also configured to direct the system to identify the one or more reference interest points of the reference patient from the reference image data of the reference patient using the interest point detection model. The at least one processor may be further configured to direct the system to determine the reference posture of the reference patient based on the reference image data.

In some embodiments, at least one processor may be configured to direct the system to determine one or more body landmarks representing one or more characteristic regions of the patient from the image data. Each patient model may further include one or more reference body landmarks of the corresponding reference patient. The matching degree between the patient and each patient model may be determined based further on the one or more body landmarks of the patient and the one or more reference body landmarks of the patient model.

In some embodiments, at least one processor may be configured to direct the system to generate a scanning plan of the patient based on the posture, or facilitate an adjustment of a position of the patient based on the posture, or evaluate a treatment plan for the patient based on the posture.

In some embodiments, the image data relating to the patient may include one or more of color image data, point-cloud data, depth image data, mesh data, or medical image data.

In some embodiments, the posture of the patient may be represented by one or more parameters relating to one or more of a position, a pose, a shape, or a size of the patient.

In some embodiments, at least a portion of the patient in the image data may be covered by an item.

In some embodiments, the interest point detection model may include a first component configured to extract a global feature vector from the image data, and a second component configured to identify the one or more interest points of the patient based on the global feature vector of the image data.

In some embodiments, the interest point detection model may be part of a posture representation determination model.

According to another aspect of the present disclosure, a system for generating an interest point detection model is provided. The system may include at least one storage medium including a set of instructions, and at least one processor configured to communicate with the at least one storage device. When executing the instructions, the at least one processor may be configured to direct the system to perform the following operations. The at least one processor may be configured to direct the system to obtain a plurality of training samples and a preliminary model. Each training sample may include sample image data of a sample patient holding a first posture and a representation of the first posture. The sample image data may have no annotation regarding interest points on the sample patient. The at least one processor may be further configured to direct the system to generate the interest point detection model by training the preliminary model using the training samples.

In some embodiments, the training the preliminary model using the training samples may include one or more iterations. For each training sample corresponding to a sample patient, each current iteration of the one or more iterations may include identifying a plurality of first candidate interest points of the corresponding sample patient from the corresponding sample image data using the preliminary model in the current iteration, generating transformed image data of the corresponding sample patient holding a second posture by transforming the posture of the corresponding sample patient from the first posture to the second posture, and identifying a plurality of second candidate interest points of the corresponding sample patient from the transformed image data of the training sample. Each second candidate interest point may correspond to one of the plurality of first candidate interest points. Each current iteration of the one or more iterations may also include determining a value of a loss function based on the plurality of first candidate interest points and the second candidate interest points of each training sample, and determining whether a termination condition is satisfied in the current iteration. In response to a determination that the termination condition is satisfied in the current iteration, each current iteration of the one or more iterations may further include designing the preliminary model in the current iteration as the interest point detection model.

In some embodiments, for each training sample, each current iteration of the one or more iterations may include determining a predicted representation of the first posture of the corresponding sample patient using the preliminary model in the current iteration based on the corresponding sample image data. Each current iteration of the one or more iterations may also include determining a value of a loss function based on the representation and the predicted representation corresponding to each training sample, and determining whether a termination condition is satisfied in the current iteration based on the value of the loss function. In response to a determination that the termination condition is satisfied in the current iteration, each current iteration of the one or more iterations may further include designing a portion of the preliminary model in the current iteration as the interest point detection model.

In some embodiments, the preliminary model may include a first component configured to extract a global feature vector from the sample image data of a first training sample, and a second component configured to identify a plurality of candidate interest points in the sample image data of the first training sample based on the global feature vector of the first training sample.

In some embodiments, the preliminary model may further include a third component configured to determine a predicted representation of the first posture of the sample patient corresponding to the first training sample based on the candidate interest points of the first training sample.

In some embodiments, the sample image data of each training sample may include one or more of point-cloud data, a three-dimensional (3D) model, or a mesh model of the corresponding sample patient.

In some embodiments, the plurality of training samples may include a first training sample corresponding to a first sample patient. To obtain a plurality of training samples, the at least one processor may be configured to direct the system to obtain initial image data of the first sample patient holding an initial posture and a representation of the initial posture. The at least one processor may be also configured to direct the system to transform the posture of the first sample patient in the initial image data from the initial posture to a transformed posture to obtain transformed image data of the first sample patient holding the transformed posture. The at least one processor may be further configured to direct the system to determine a representation of the transformed posture based on the representation of the initial posture, and generate the first training sample including the transformed image data corresponding to the transformed posture of the first sample patient.

According to another aspect of the present disclosure, a method for generating an interest point detection model is provided. The method may be implemented on a computing device having at least one processor and at least one storage device. The method may include acquiring image data relating to a patient holding a posture, and identifying one or more interest points of the patient from the image data using an interest point detection model. The method may also include acquiring a plurality of patient models. Each patient model may represent a reference patient holding a reference posture, and include one or more reference interest points of the referent patient and a reference representation of the reference posture. The method may further include determining, based on a comparison between the at least one interest point of the patient and the at least one reference interest point in each of the plurality of patient models, a representation of the posture of the patient.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 8 is a flowchart illustrating an exemplary process for generating an interest point detection model according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Figure 2:
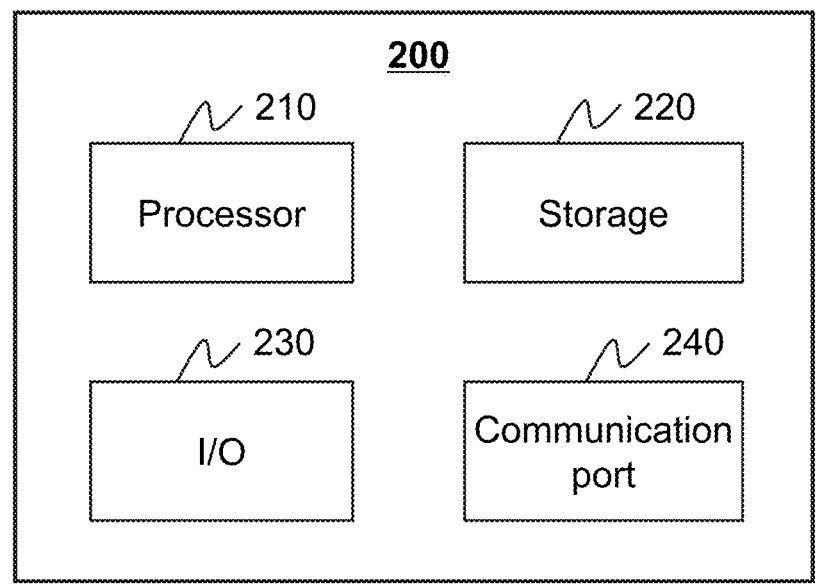
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "image" in the present disclosure is used to collectively refer to image data (e.g., scan data, projection data) and/or images of various forms, including a two-dimensional (2D) image, a three-dimensional (3D) image, a four-dimensional (4D) image, etc. The term "pixel" and "voxel" in the present disclosure are used interchangeably to refer to an element of an image.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and methods for non-invasive biomedical imaging, such as for disease diagnostic or research purposes. In some embodiments, the systems may include a single modality imaging system and/or a multi-modality imaging system. The single modality imaging system may include, for example, an ultrasound imaging system, an X-ray imaging system, an computed tomography (CT) system, a magnetic resonance imaging (MRI) system, an ultrasonography system, a positron emission tomography (PET) system, an optical coherence tomography (OCT) imaging system, an ultrasound (US) imaging system, an intravascular ultrasound (IVUS) imaging system, a near infrared spectroscopy (NIRS) imaging system, a far infrared (FIR) imaging system, or the like, or any combination thereof. The multi-modality imaging system may include, for example, an X-ray imaging-magnetic resonance imaging (X-ray-MRI) system, a positron emission tomography-X-ray imaging (PET-X-ray) system, a single photon emission computed tomography-magnetic resonance imaging (SPECT-MRI) system, a positron emission tomography-computed tomography (PET-CT) system, a C-arm system, a digital subtraction angiography-magnetic resonance imaging (DSA-MRI) system, etc. It should be noted that the imaging system described below is merely provided for illustration purposes, and not intended to limit the scope of the present disclosure.

The term "imaging modality" or "modality" as used herein broadly refers to an imaging method or technology that gathers, generates, processes, and/or analyzes imaging information of an object. The object may include a biological object and/or a non-biological object. The biological object may be a human being, an animal, a plant, or a portion thereof (e.g., a cell, a tissue, an organ, etc.). In some embodiments, the object may be a man-made composition of organic and/or inorganic matters that are with or without life.

An aspect of the present disclosure relates to systems and methods for determining a representation of a posture of a patient. As used herein, the representation of a posture refers to a quantitative expression that describes the posture and may also be referred to as a posture representation for brevity. The systems and methods may acquire image data relating to the patient holding the posture, and identify one or more interest points of the patient from the image data using an interest point detection model. The systems and methods may further acquire a plurality of patient models (or referred to as deformable surface models). Each patient model may represent a reference patient holding a reference posture and include one or more reference interest points of the referent patient and a reference representation of the reference posture. The systems and methods may further determine the representation of the posture of the patient based on a comparison between the interest point(s) of the patient and the reference interest point(s) in each of the plurality of patient models.

According to some embodiments of the present disclosure, the interest point(s) of the patient may be identified using an interest point detection model. The interest point detection model may be a neural network model that is configured to receive the image data of the patient as an input and output the interest point(s) of the patient. Embodiments of the present disclosure do not rely on prior defined interest point(s), such as an anatomically joint or the abdomen of the patient. Instead, an interest point detection model, which learns an optimal mechanism for identifying interest points from training data, may be used to determine the interest point(s) from the image data. Compared with the prior defined interest point(s), such methods of identifying interest point(s) may be more reliable and robust, insusceptible to human error or subjectivity, and/or fully automated. In addition, an accurate identification of a prior defined interest point depends on that the prior defined interest point is visible in the image data, while the methods disclosed herein may be used to accurately identify interest points visible in the image data as well as interest points covered by an item (e.g., the patient's clothes, a mask, or a blanket). The accurate identification of the interest point(s) may improve the accuracy of patient positioning.

According to another aspect of the present disclosure, an interest point detection model may be generated by training a preliminary model using a plurality of training samples. Each training sample may include sample image data of a sample patient holding a posture and a representation of the posture. The sample image data of each training sample may include no annotation regarding interest points on a corresponding sample patient. This may obviate the need of annotating interest points on sample image data, which may improve the efficiency of training the interest point detection model and allow automation of the methods.

Figure 1:
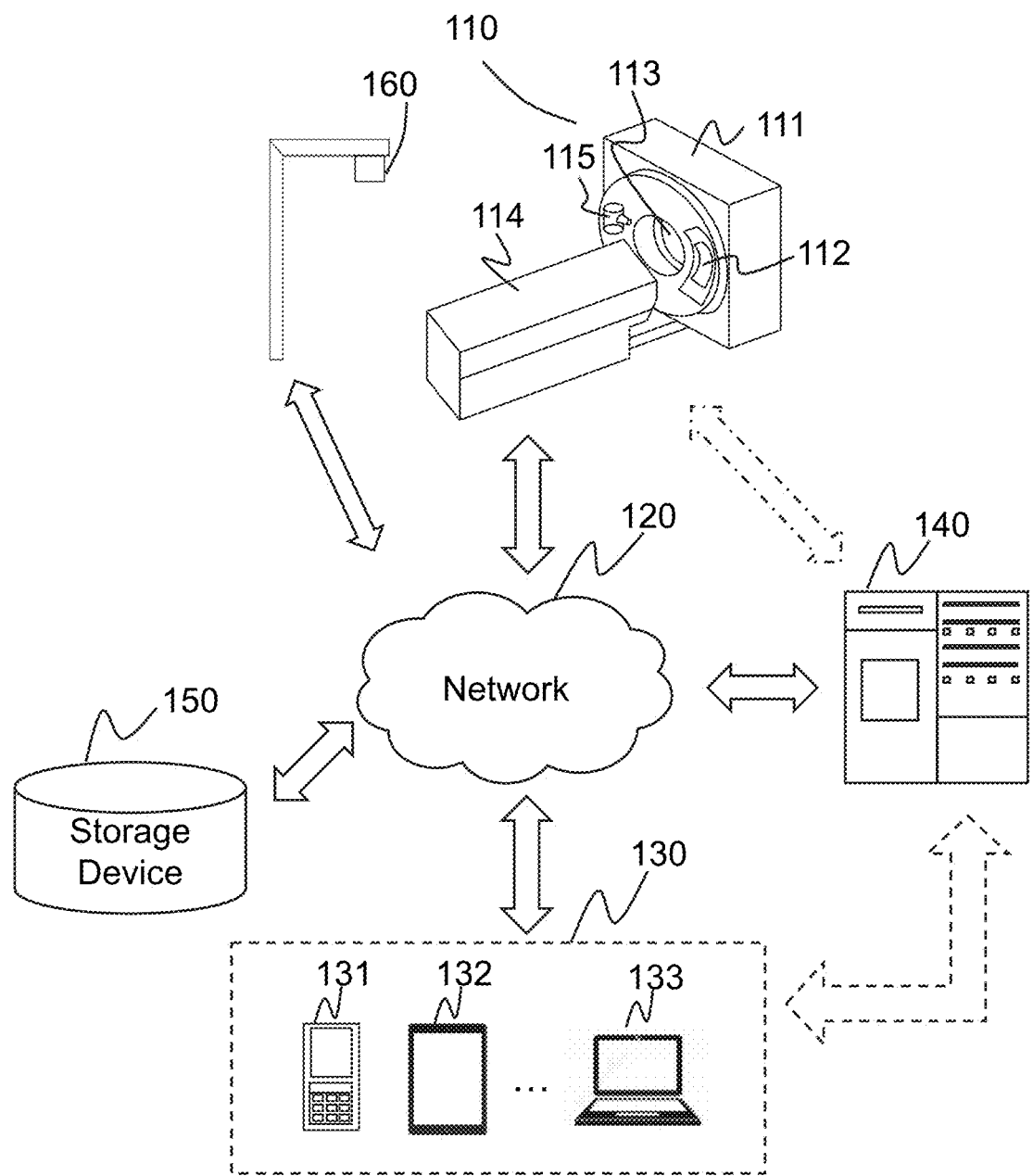
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure. As shown, the imaging system 100 may include a medical imaging device 110, a network 120, one or more terminals 130, a processing device 140, a storage device 150, and an image acquisition device 160. In some embodiments, the medical imaging device 110, the terminal(s) 130, the processing device 140, the storage device 150, and/or the image acquisition device 160 may be connected to and/or communicate with each other via a wireless connection, a wired connection, or a combination thereof. The connection between the components of the imaging system 100 may be variable. Merely by way of example, the medical imaging device 110 may be connected to the processing device 140 through the network 120 or directly. As a further example, the storage device 150 may be connected to the processing device 140 through the network 120 or directly.

The medical imaging device 110 may generate or provide image data related to an object via scanning the object. In some embodiments, the object may include a biological object and/or a non-biological object. For example, the object may include a specific portion of a body, such as a head, a thorax, an abdomen, or the like, or a combination thereof. In some embodiments, the medical imaging device 110 may include a single-modality scanner (e.g., a CT scanner) and/or multi-modality scanner (e.g., a PET-CT scanner) as described elsewhere in this disclosure. In some embodiments, the image data relating to the object may include projection data, one or more images of the object, etc. The projection data may include raw data generated by the medical imaging device 110 by scanning the object and/or data generated by a forward projection on an image of the object.

In some embodiments, the medical imaging device 110 may include a gantry 111, a detector 112, a detection region 113, a scanning table 114, and a radioactive scanning source 115. The gantry 111 may support the detector 112 and the radioactive scanning source 115. The object may be placed on the scanning table 114 and moved into the detection region to be scanned. The radioactive scanning source 115 may emit radioactive rays to the object. The radioactive rays may include a particle ray, a photon ray, or the like, or a combination thereof. In some embodiments, the radioactive rays may include a plurality of radiation particles (e.g., neutrons, protons, electron, p-mesons, heavy ions), a plurality of radiation photons (e.g., X-ray, a y-ray, ultraviolet, laser), or the like, or a combination thereof. The detector 112 may detect radiations and/or radiation events (e.g., gamma photons) emitted from the detection region 113. In some embodiments, the detector 112 may include a plurality of detector units. The detector units may include a scintillation detector (e.g., a cesium iodide detector) or a gas detector. The detector unit may be a single-row detector or a multi-rows detector.

The network 120 may include any suitable network that can facilitate the exchange of information and/or data for the imaging system 100. In some embodiments, one or more components of the imaging system 100 (e.g., the medical imaging device 110, the processing device 140, the storage device 150, the terminal(s) 130) may communicate information and/or data with one or more other components of the imaging system 100 via the network 120. For example, the processing device 140 may obtain image data from the medical imaging device 110 via the network 120. As another example, the processing device 140 may obtain user instruction(s) from the terminal(s) 130 via the network 120.

The network 120 may be or include a public network (e.g., the Internet), a private network (e.g., a local area network (LAN)), a wired network, a wireless network (e.g., an 802.11 network, a Wi-Fi network), a frame relay network, a virtual private network (VPN), a satellite network, a telephone network, routers, hubs, switches, server computers, and/or any combination thereof. For example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The terminal(s) 130 may enable user interaction between a user and the imaging system 100. For example, the terminal(s) 130 may display an image of a patient, wherein one or more interest points of the patient may be annotated on the image. In some embodiments, the terminal(s) 130 may include a mobile device 131, a tablet computer 132, a laptop computer 133, or the like, or any combination thereof. For example, the mobile device 131 may include a mobile phone, a personal digital assistant (PDA), a gaming device, a navigation device, a point of sale (POS) device, a laptop, a tablet computer, a desktop, or the like, or any combination thereof. In some embodiments, the terminal(s) 130 may include an input device, an output device, etc. In some embodiments, the terminal(s) 130 may be part of the processing device 140.

The processing device 140 may process data and/or information obtained from the medical imaging device 110, the storage device 150, the terminal(s) 130, or other components of the imaging system 100. In some embodiments, the processing device 140 may be a single server or a server group. The server group may be centralized or distributed. For example, the processing device 140 may generate one or more models (e.g., an interest point detection model and/or a posture representation determination model) by training a preliminary model using a plurality of training samples. As another example, the processing device 140 may apply the one or more models in, for example, identifying at least one interest point of a patient and/or determining a posture representation of the patient based on image data of the patient. In some embodiments, the model(s) may be generated by a processing device, while the application of the model(s) may be performed on a different processing device. In some embodiments, the model(s) may be generated by a processing device of a system different than the imaging system 100 or a server different than the processing device 140 on which the application of the model(s) is performed. For instance, the model(s) may be generated by a first system of a vendor who provides and/or maintains such model(s), while interest point detection and/or posture representation determination based on image data relating to a patient based on the provided model(s) may be performed on a second system of a client of the vendor. In some embodiments, the application of the model(s) may be performed online in response to a request for, for example, interest point detection and/or posture representation determination from image data of a patient. In some embodiments, the model(s) may be generated offline.

In some embodiments, the processing device 140 may be local to or remote from the imaging system 100. For example, the processing device 140 may access information and/or data from the medical imaging device 110, the storage device 150, the terminal(s) 130, and/or the image acquisition device 160 via the network 120. As another example, the processing device 140 may be directly connected to the medical imaging device 110, the terminal(s) 130, the storage device 150, and/or the image acquisition device 160 to access information and/or data. In some embodiments, the processing device 140 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 140 may be implemented by a computing device 200 having one or more components as described in connection with FIG. 2.

In some embodiments, the processing device 140 may include one or more processors (e.g., single-core processor(s) or multi-core processor(s)). Merely by way of example, the processing device 140 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The storage device 150 may store data, instructions, and/or any other information. In some embodiments, the storage device 150 may store data obtained from the processing device 140, the terminal(s) 130, the medical imaging device 110, and/or the image acquisition device 160. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform as described elsewhere in the disclosure.

In some embodiments, the storage device 150 may be connected to the network 120 to communicate with one or more other components of the imaging system 100 (e.g., the processing device 140, the terminal(s) 130). One or more components of the imaging system 100 may access the data or instructions stored in the storage device 150 via the network 120. In some embodiments, the storage device 150 may be part of the processing device 140.

The image acquisition device 160 may be and/or include any suitable device that is capable of capturing image data of the object. For example, the image acquisition device 160 may include a camera (e.g., a digital camera, an analog camera, etc.), a red-green-blue (RGB) sensor, an RGB-depth (RGB-D) sensor, or another device that can capture color image data of the object. As another example, the image acquisition device 160 may be used to acquire point-cloud data of the object. The point-cloud data may include a plurality of data points, each of which may represent a physical point on a body surface of the object and can be described using one or more feature values of the physical point (e.g., feature values relating to the position and/or the composition of the physical point). Exemplary image acquisition devices 160 capable of acquiring point-cloud data may include a 3D scanner, such as a 3D laser imaging device, a structured light scanner (e.g., a structured light laser scanner). Merely by way of example, a structured light scanner may be used to execute a scan on the object to acquire the point cloud data. During the scan, the structured light scanner may project structured light (e.g., a structured light spot, a structured light grid) that has a certain pattern toward the object. The point-cloud data may be acquired according to the structure light projected on the object. As yet another example, the image acquisition device 160 may be used to acquire depth image data of the object. The depth image data may refer to image data that includes depth information of each physical point on the body surface of the object, such as a distance from each physical point to a specific point (e.g., an optical center of the image acquisition device 160). The depth image data may be captured by a range sensing device, e.g., a structured light scanner, a time-of-flight (TOF) device, a stereo triangulation camera, a sheet of light triangulation device, an interferometry device, a coded aperture device, a stereo matching device, or the like, or any combination thereof.

In some embodiments, the image acquisition device 160 may be a device independent from the medical imaging device 110 as shown in FIG. 1. Alternatively, the image acquisition device 160 may be integrated into or mounted on the medical imaging device 110 (e.g., the gantry 111). In some embodiments, the image data acquired by the image acquisition device 160 may be transmitted to the processing device 140 for further analysis, e.g., identifying interest point(s) of the object. Additionally or alternatively, the image data acquired by the image acquisition device 160 may be transmitted to a terminal device (e.g., the terminal(s) 130) for display and/or a storage device (e.g., the storage device 150) for storing.

It should be noted that the above description of the imaging system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the imaging system 100 may include one or more additional components. Additionally or alternatively, one or more components of the imaging system 100, such as the image acquisition device 160 and/or the medical imaging device 110 described above may be omitted. As another example, two or more components of the imaging system 100 may be integrated into a single component.

FIG. 2 is a schematic diagram illustrating exemplary hardware and/or software components of a computing device 200 according to some embodiments of the present disclosure. The computing device 200 may be used to implement any component of the imaging system 100 as described herein. For example, the processing device 140 and/or the terminal 130 may be implemented on the computing device 200, respectively, via its hardware, software program, firmware, or a combination thereof. Although only one such computing device is shown, for convenience, the computer functions relating to the imaging system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor 210 may process image data obtained from the medical imaging device 110, the terminal(s) 130, the storage device 150, the image acquisition device 160, and/or any other component of the imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the medical imaging device 110, the terminal(s) 130, the storage device 150, the image acquisition device 160, and/or any other component of the imaging system 100. In some embodiments, the storage 220 may include a mass storage device, a removable storage device, a volatile read-and-write memory, a read-only memory (ROM), or the like, or any combination thereof. In some embodiments, the storage 220 may store one or more programs and/or instructions to perform exemplary methods described in the present disclosure. For example, the storage 220 may store a program for the processing device 140 to execute to generate an interest point detection model.

The I/O 230 may input and/or output signals, data, information, etc. In some embodiments, the I/O 230 may enable a user interaction with the processing device 140. In some embodiments, the I/O 230 may include an input device and an output device. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to another component (e.g., the processing device 140) via, for example, a bus, for further processing. Other types of the input device may include a cursor control device, such as a mouse, a trackball, or cursor direction keys, etc. The output device may include a display (e.g., a liquid crystal display (LCD), a light-emitting diode (LED)-based display, a flat panel display, a curved screen, a television device, a cathode ray tube (CRT), a touch screen), a speaker, a printer, or the like, or a combination thereof.

The communication port 240 may be connected to a network (e.g., the network 120) to facilitate data communications. The communication port 240 may establish connections between the processing device 140 and the medical imaging device 110, the terminal(s) 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
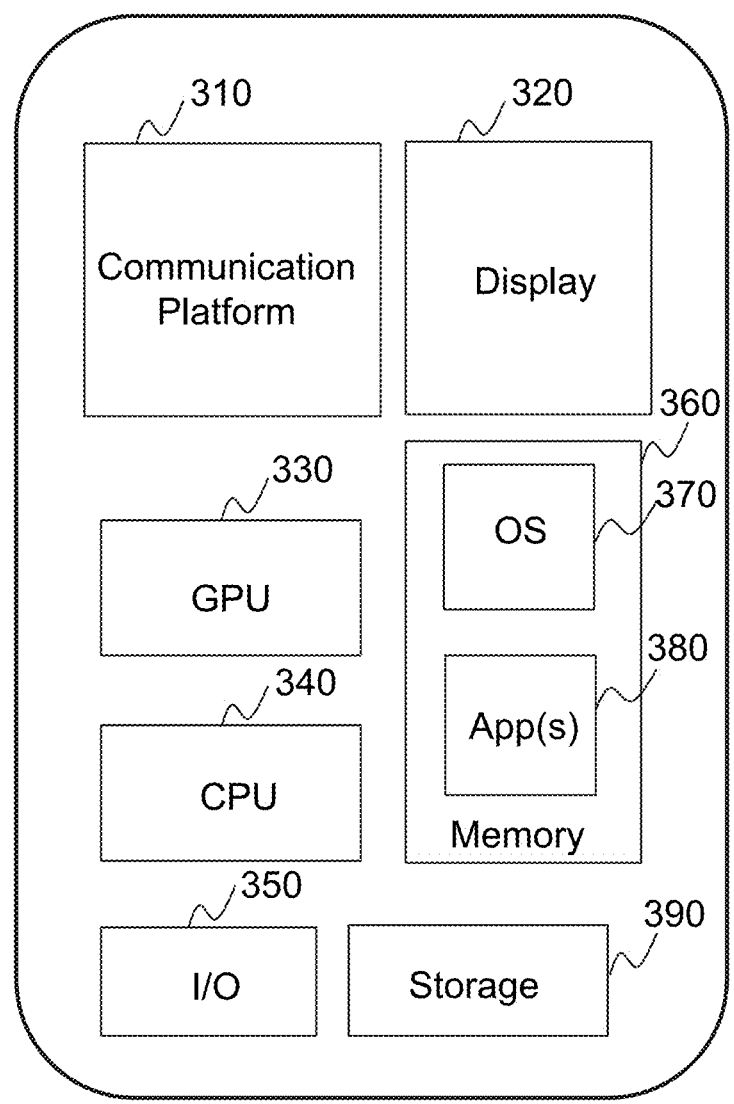
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, one or more components (e.g., a terminal 130 and/or the processing device 140) of the imaging system 100 may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4A:
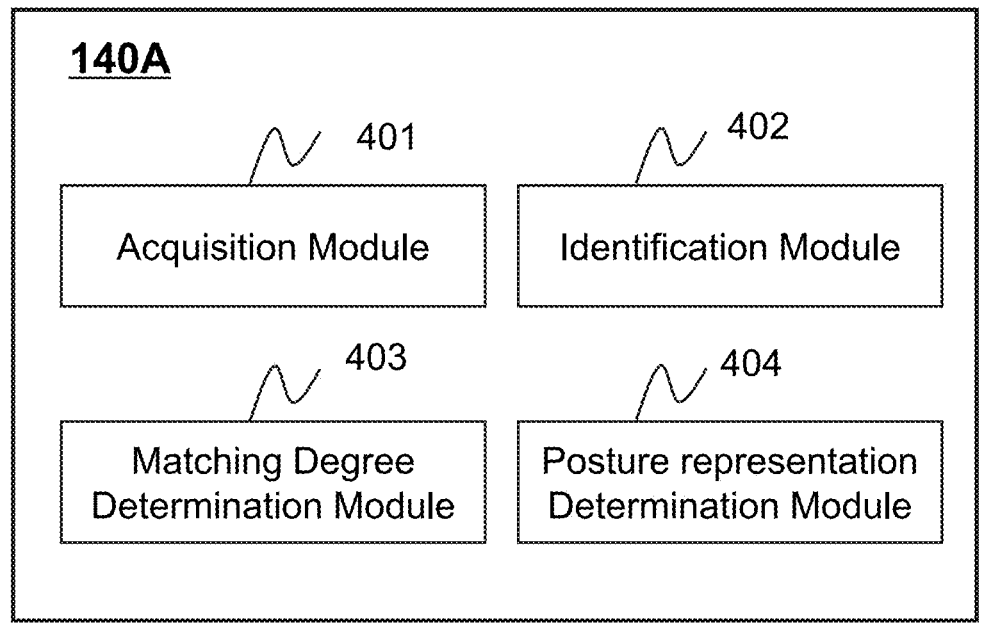
FIGS. 4A and 4B are block diagrams illustrating exemplary processing devices according to some embodiments of the present disclosure.
Figure 4B:
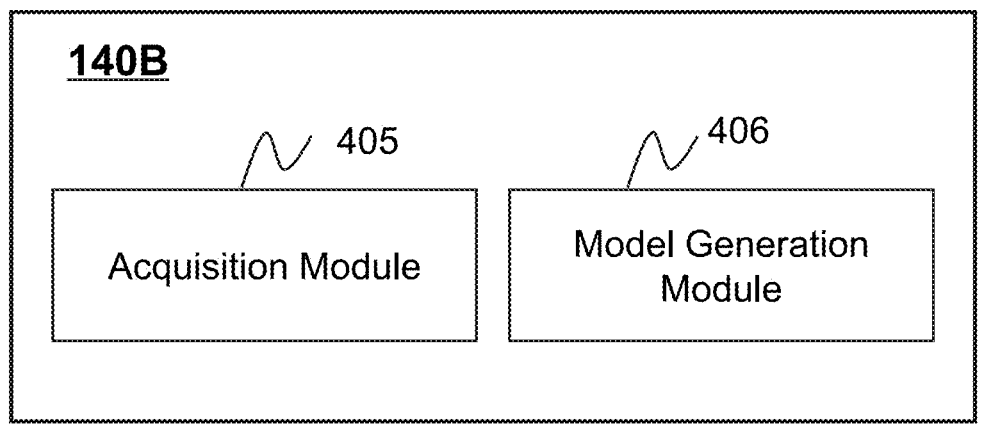

FIGS. 4A and 4B are block diagrams illustrating exemplary processing devices 140A and 140B according to some embodiments of the present disclosure. The processing devices 140A and 140B may be exemplary processing devices 140 as described in connection with FIG. 1. In some embodiments, the processing device 140A may be configured to apply an interest point detection model in determining a posture representation of a patient. The processing device 140B may be configured to generate one or more training samples and/or generate one or more models (e.g., an interest point detection model and/or a posture representation determination model) using the training samples.

In some embodiments, the processing devices 140A and 140B may be respectively implemented on a processing unit (e.g., a processor 210 illustrated in FIG. 2 or a CPU 340 as illustrated in FIG. 3). Merely by way of example, the processing devices 140A may be implemented on a CPU 340 of a terminal device, and the processing device 140B may be implemented on a computing device 200. Alternatively, the processing devices 140A and 140B may be implemented on a same computing device 200 or a same CPU 340. For example, the processing devices 140A and 140B may be implemented on a same computing device 200.

As shown in FIG. 4A, the processing device 140A may include an acquisition module 401, an identification module 402, a matching degree determination module 403, and a posture representation determination module 404.

The acquisition module 401 may be configured to acquire information relating to the imaging system 100. For example, the acquisition module 401 may acquire image data (e.g., one or more images) relating to a patient holding a posture, a patient model representing a reference patient holding a reference posture, a reference image data of the reference patient, or the like, or any combination thereof. As used herein, a posture of a patient may reflect one or more of a position, a pose, a shape, a size, etc., of the patient (or a portion thereof). More descriptions regarding the acquisition of the information relating to the imaging system 100 may be found elsewhere in the present disclosure. See, e.g., FIGS. 5 and 6 and relevant descriptions thereof.

The identification module 402 may be configured to identify one or more interest points of the patient from the image data relating to the patient. In some embodiments, the identification module 402 may identify the interest point using an interest point detection model, which may refer to a neural network model configured to receive image data relating to the patient and output the interest point(s) of the patient. An interest point of a patient may refer to a representative physical point of the patient identified by the interest point detection model. In some embodiments, the image data obtained by the acquisition module 401 may be inputted into the interest point detection model, and the interest point detection model may output the interest point(s) of the patient. More descriptions regarding the identification of the one or more interest points of the patient may be found elsewhere in the present disclosure. See, e.g., operation 502 in FIG. 5 and relevant descriptions thereof.

The matching degree determination module 403 may be configured to determine a matching degree between the patient and a patient model. The matching degree between the patient and the patient model may measure how similar the posture of the patient is to the reference posture of the reference patient corresponding to the patient model. In some embodiments, the matching degree may be determined based on the interest point(s) of the patient and one or more reference intersect points of the patient model. More descriptions regarding the determination of the matching degree may be found elsewhere in the present disclosure. See, e.g., operation 504 in FIG. 5 and relevant descriptions thereof.

The posture representation determination module 404 may be configured to determine a posture representation of the patient. A posture representation of the patient may refer to a quantitative expression that describes the posture of the patient. In some embodiments, the posture representation determination module 404 may determine the posture representation of the patent based on the matching degrees between the patient and a plurality of patient models. For example, the posture representation determination module 404 may select a patient model that has the highest matching degree with patient among the patient models, and designate a reference representation of the reference patient corresponding to the selected patient model as the posture representation of the patient. More descriptions regarding the determination of the posture representation of the patient may be found elsewhere in the present disclosure. See, e.g., operation 505 in FIG. 5 and relevant descriptions thereof.

As shown in FIG. 4B, the processing device 140B may include an acquisition module 405 and a model generation module 406.

The acquisition module 405 may be configured to obtain information relating to the imaging system 100. For example, the acquisition module 405 may obtain a plurality of training samples and a preliminary model, wherein the training samples may be used to train the preliminary model to generate a trained model (e.g., an interest point detection model, a posture representation determination model). More descriptions regarding the training samples and the preliminary model may be found elsewhere in the present disclosure. See, e.g., FIGS. 7 and 8 and relevant descriptions thereof.

The model generation module 406 may be configured to generate one or more models (e.g., an interest point detection model, a patient model, a posture representation determination model). For example, the model generation module 406 may generate the interest point detection model by training a preliminary model using a plurality of training samples. In some embodiments, the model generation module 406 may generate a model using one or more machine learning algorithms as described elsewhere in this disclosure (e.g., FIG. 5 and the relevant descriptions) More descriptions regarding the generation of the interest point detection model and/or the posture representation determination model may be found elsewhere in the present disclosure. See, e.g., FIGS. 7 and 8 and relevant descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140A and/or the processing device 1406 may share two or more of the modules, and any one of the modules may be divided into two or more units. For instance, the processing devices 140A and 1406 may share a same acquisition module; that is, the acquisition module 401 and the acquisition module 405 are a same module. In some embodiments, the processing device 140A and/or the processing device 140B may include one or more additional modules, such a storage module (not shown) for storing data. In some embodiments, the processing device 140A and the processing device 140B may be integrated into one processing device 140.

Figure 5:
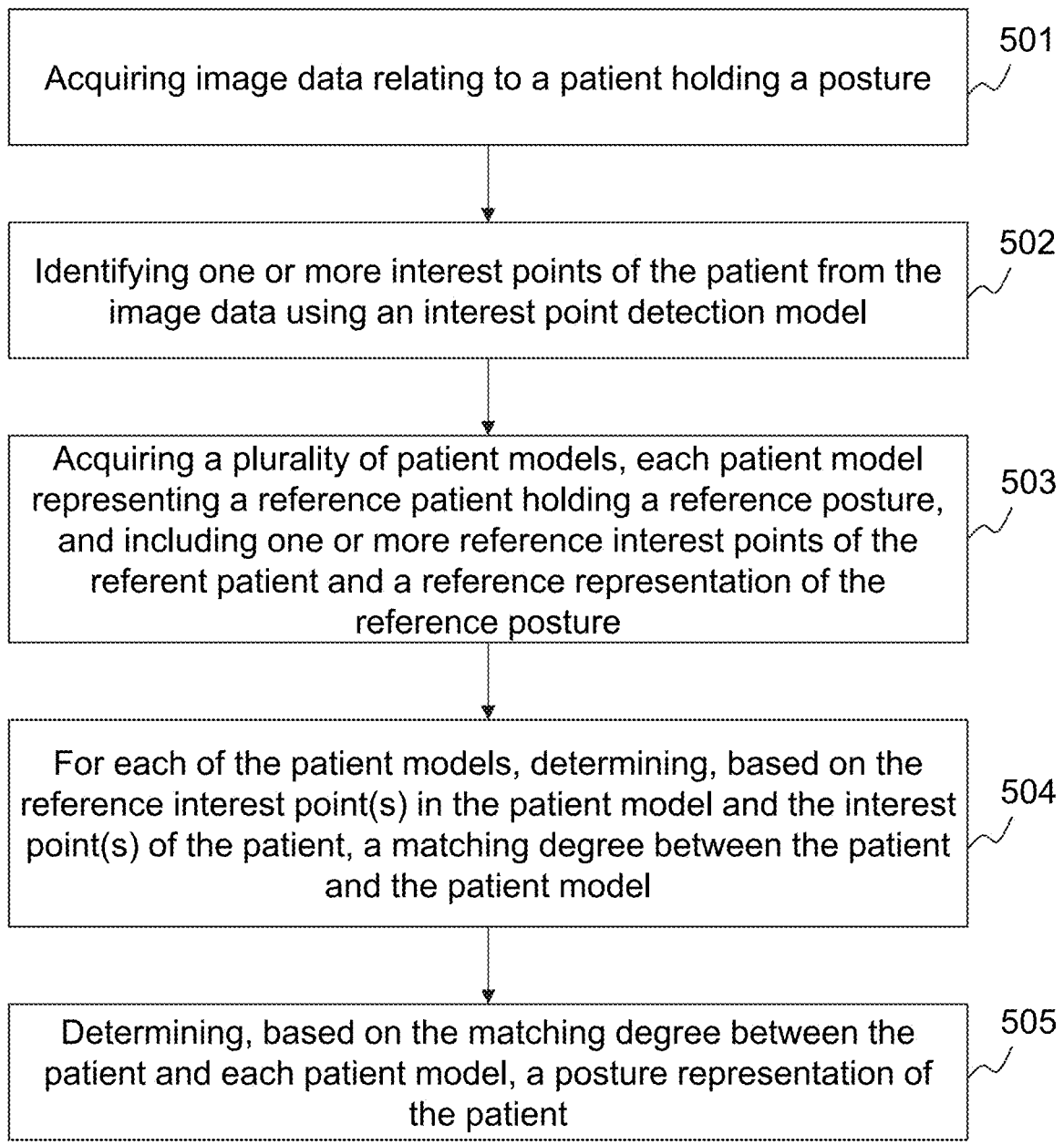
FIG. 5 is a flowchart illustrating an exemplary process for determining a posture representation of a patient according to some embodiments of the present disclosure.

FIG. 5 is a flowchart illustrating an exemplary process for determining a posture representation of a posture of a patient according to some embodiments of the present disclosure. In some embodiments, process 500 may be executed by the imaging system 100. For example, the process 500 may be implemented as a set of instructions (e.g., an application) stored in a storage device (e.g., the storage device 150, the storage 220, and/or the storage 390). In some embodiments, the processing device 140A (e.g., the processor 210 of the computing device 200, the CPU 340 of the mobile device 300, and/or one or more modules illustrated in FIG. 4A) may execute the set of instructions and may accordingly be directed to perform the process 500.

As used herein, a posture of a patient may reflect one or more of a position, a pose, a shape, a size, etc., of the patient (or a portion thereof). A posture representation of a patient may refer to a quantitative expression that describes the posture of the patient. For example, the posture representation may include one or more parameter values relating to the posture of the patient and/or a vector (or matrix) that encodes the one or more parameter values. Exemplary parameter values relating to the posture of the patient may include a coordinate of a portion (e.g., the head, the neck, a hand, a leg, and/or a foot) of the patient in a certain coordinate system, a joint angle of a joint (e.g., a shoulder joint, a knee joint, an elbow joint, and/or an ankle joint) of the patient, a shape and/or a size of a portion of the patient, a height of the entire patient or a portion (e.g., the upper body, the lower body) of the patient, or the like, or any combination thereof.

In 501, the processing device 140A (e.g., the acquisition module 401, the interface circuits of the processor 210) may acquire image data relating to the patient holding the posture.

As used herein, image data relating to the patient may refer to image data corresponding to the entire patient or image data corresponding to a portion of the patient (e.g., an upper part, a lower part, or the chest of the patient). For illustration purposes, the following description is provided with reference to image data including the whole body of the patient. In some embodiments, the patient represented in the acquired image data may have the posture or contour of his/her body exposed or visible (e.g., the posture or contour of the patient not covered by an item, e.g., clothes, a mask, a blanket) or partially exposed or visible (e.g., the posture or contour of the patient partially covered by an item, e.g., clothes, a mask, a blanket). In some embodiments, the image data relating to the patient may include one or more two-dimensional (2D) image (e.g., a slice image), a three-dimensional (3D) image, a four-dimensional (4D) image (a series of 3D images over time), and/or any related image data (e.g., scan data, projection data, etc.

In some embodiments, the image data may include color image data, point-cloud data, depth image data, mesh data, or medical image data, or the like, or any combination thereof, of the patient. The color image data may include color information, such as an RGB image of the patient. The point-cloud data may include a plurality of data points, each of which may represent a physical point on a body surface of the patient and include one or more feature values of the physical point (e.g., feature values relating to the position and/or the composition of the physical point). The depth image data may refer to image data that includes depth information of each of a plurality of physical points on the body surface of the patient. The mesh data may include a collection of vertices, edges, and faces that defines a 3D shape of the patient. The medical image data may include anatomical information of the patient for, e.g., clinical analysis, medical intervention, or research purposes.

In some embodiments, the image data of the patient may be captured by an image acquisition device, such as the medical imaging device 110, the image acquisition device 160 of the system 100, or an external image acquisition device. For example, the color image data may be captured by a camera, an RGB sensor, an RGB-D sensor, or the like. The point-cloud data may be captured by a 3D scanner, such as a 3D laser imaging device, a structured light scanner (e.g., a structured light laser scanner). The depth image data may be captured by a range device, e.g., a structured light scanner, a TOF device, or the like, as described elsewhere in this disclosure (e.g., FIG. 1 and the relevant descriptions). The medical image data may be acquired by a medical imaging device as described elsewhere in this disclosure (e.g., FIG. 1 and the relevant descriptions). For example, the medical image data may be acquired by a CT device, an MRI device, an ultrasonography system, an X-ray device, a PET device, or the like, by performing a scan of the patient.

In some embodiments, the processing device 140A may obtain the image data from an image acquisition device that is capable of acquiring the image data as described above. Alternatively, the image data may be acquired by the image acquisition device and stored in a storage device (e.g., the storage device 150, the storage 220, the storage 390, or an external source). The processing device 140A may retrieve the image data from the storage device.

In 502, the processing device 140A (e.g., the identification module 402, the processing circuits of the processor 210) may identify one or more interest points of the patient from the image data using an interest point detection model.

As used herein, an interest point detection model may refer to a neural network model configured to receive image data relating to a patient and output the interest point(s) of the patient. An interest point of a patient may refer to a representative physical point of the patient identified by the interest point detection model. For example, the interest point may include one or more anatomical joints (e.g., a shoulder joint, a knee joint, an elbow joint, and an ankle joint) and/or one or more other key physical points (e.g., a navel) of the patient that are determined to be representative by the interest point detection model. In some embodiments, as described in connection with 501, the patient represented in the acquired image data may have an exposed or visible body contour, the identified interest point(s) may include point(s) located on the body surface of the patient. Alternatively, the patient represented in the acquired image data may have a partially exposed or visible body contour, for example, with a portion being covered by an item (e.g., clothes). The identified interest point(s) may include a point located on the visible portion of the body surface of the patient and/or a point which represents an invisible portion and locates at the portion of the item covering the invisible portion. Merely by way of example, the upper portion of the patient may be covered by clothes in the image data, the identified point(s) may include a point representing a left shoulder of the patient located at the corresponding part of the clothes covering the left shoulder.

In some embodiments, the image data obtained in 501 may be inputted into the interest point detection model, and the interest point detection model may output the interest point(s) of the patient. Each interest point may be represented by one or more feature values relating to one or more features of the interest point, for example, a position, a low-level feature (e.g., an edge feature, a textural feature, a contour feature), a high-level feature, or a complicated feature (e.g., a deep hierarchical feature), or the like, or any combination thereof, of the interest point.

In some embodiments, the interest point detection model may be obtained from one or more components of the imaging system 100 or an external source via a network (e.g., the network 120). For example, the interest point detection model may be previously trained by a computing device (e.g., the processing device 140B), and stored in a storage device (e.g., the storage device 150, the storage 220, and/or the storage 390) of the imaging system 100. The processing device 140A may access the storage device and retrieve the interest point detection model. In some embodiments, the interest point detection model may be generated according to a machine learning algorithm. The machine learning algorithm may include but not be limited to an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. The machine learning algorithm used to generate the interest point detection model may be a supervised learning algorithm, a semi-supervised learning algorithm, an unsupervised learning algorithm, or the like. In some embodiments, the interest point detection model may be generated by a computing device (e.g., the processing device 140B) by performing a process (e.g., process 700) for generating an interest point detection model disclosed herein. More descriptions regarding the generation of the interest point detection model may be found elsewhere in the present disclosure. See, e.g., FIG. 7 and relevant descriptions thereof.

In some embodiments, the interest point detection model may include a first component and a second component. The first component may be configured to extract a global feature vector from the image data of the patient. The global feature vector of image data may include one or more features (e.g., a shape feature, a contour feature, a texture feature) of the whole image data. The second component may be configured to determine the interest point(s) of the patient based on the extracted global feature vector. In some embodiments, the interest point detection model may part of a posture representation determination model. The posture representation determination model may be a neural network model that is configured to receive image data of a patient holding a certain posture as an input, and output a representation of the certain posture. In some embodiments, the posture representation determination model may include the interest point detection model and a third component. The third component may be configured to determine a representation of the posture of the patient based on the identified interest point(s). In some embodiments, the first component, the second component, and the third component may be any neural network component that can realize their respective functions. Merely by way of example, the first component may be a convolutional neural network (CNN), a random forest network, or any neural network component for feature extraction. The second component may be a region proposal network (RPN). The third component may be a fully connected network layer.

In 503, the processing device 140A (e.g., the acquisition module 401, the interface circuits of the processor 210) may acquire a plurality of patient models.

As used herein, a patient model may refer to a model representing a reference patient holding a reference posture. In some embodiments, the plurality of patient models may include patient models representing a same reference patient holding different poses and/or at different positions. For example, the patient models may include a patient model of a reference patient in a prone position and another patient model of the reference patient in a supine position. As another example, the patient models may include different patient models of a same reference patient holding different knee joint angles. Additionally or alternatively, the plurality of patient models may include patient models representing different reference patients, for example, different reference patients having different body shapes (e.g., heights and/or weights) and/or holding different poses.

In some embodiments, a patient model representing a reference patient may include one or more reference interest point(s) of the reference patient and a reference representation of the reference posture. A reference interest point of the reference patient may refer to an interest point of the reference patient. Similar to an interest point of the patient described in operation 502, a reference interest point may be represented by one or more feature values (e.g., a reference position) of the reference interest point. The reference representation of the reference posture may refer to a representation, e.g., a quantitative expression, of the reference posture.

Optionally, the patient model may further include one or more reference body landmarks of the corresponding reference patient. A reference body landmark may represent a characteristic region of the reference patient. As used herein, a characteristic region of a human may refer to a predetermined representative body region of the human. Exemplary characteristic regions of a human may include one or more anatomical joints, a shoulder, an ankle, the waist, a knee, a groin, or the like, or any combination thereof. The characteristic region(s) of a human may be a default setting or set by a user of the imaging system 100. In some embodiments, the reference body landmark(s) of a patient model may be annotated manually by a user (e.g., a doctor, an imaging specialist, a technician). Alternatively, the reference body landmark(s) may be generated by a computing device (e.g., the processing device 140) automatically according to an image analysis algorithm (e.g., an image segmentation algorithm). Alternatively, the reference body landmark(s) may be generated by the computing device semi-automatically based on an image analysis algorithm in combination with information provided by a user. Exemplary information provided by the user may include a parameter relating to the image analysis algorithm, a position parameter relating to a characteristic region, an adjustment to, or rejection or confirmation of a preliminary body landmark generated by the computing device, etc. In some embodiments, each reference body landmark may be represented by one or more reference feature values relating to one or more features (e.g., a position) of the corresponding characteristic region. The feature(s) of a characteristic region may be the same as or different from the feature(s) of a reference interest point.

In some embodiments, a patient model of a reference patient may be a 2D model or a 3D model of the reference patient annotated with one or more reference interest points and optionally one or more body landmarks of the reference patient. For example, the patient model may be a 2D skeleton model, a 3D skeleton model, a 3D mesh model, etc. A 2D skeleton model of a reference patient may include an image illustrating one or more anatomical joints and/or bones of the reference patient in 2D space. A 3D skeleton model of a reference patient may include an image illustrating one or more anatomical joints and/or bones of the reference patient in 3D space. A 3D mesh model of a reference patient may include a plurality of vertices, edges, and faces that define a 3D shape of the reference patient.

In some embodiments, at least one first patient model of the patient models obtained in 503 may be previously generated by a computing device of the imaging system 100. For example, a first patient model may be generated by the processing device 140 by performing exemplary processes for generating a patient model (e.g., process 600) disclosed in the present disclosure, and stored in a storage device (e.g., the storage device 150, the storage 220, and/or the storage 390, an external source). The processing device 140A may retrieve the first patient model from the storage device directly or via a network (e.g., the network 120). Additionally or alternatively, at least one second patient model of the patient models may be generated and provided by a system of a vendor that provides and/or maintains such patient model, wherein the system of the vendor is different from the imaging system 100. The processing device 140A may acquire the at least one second patient model from the system of the vendor via a network (e.g., the network 120). Using previously generated patient models may improve the efficiency of determining the posture representation of the patient.

In some embodiments, the processing device 140A may acquire the patient models according to one or more characteristics, e.g., the gender, the body shape, or the like, of the patient. Merely by way of example, a plurality of sets of patient models may be available, wherein each set of patient models may represent reference patients with a particular characteristic (e.g., having a particular gender and/or a particular body shape). The processing device 140A may acquire the set of patient models that represents reference patients having the same characteristic as or a similar characteristic to the patient. For example, if the patient is a female, the processing device 140A may obtain a set of patient models representing female reference patients for further analysis.

After the patient models are acquired, the processing device 140A may determine a representation of the posture of the patient based on a comparison between the interest point(s) of the patient and the reference interest point(s) in each of the plurality of patient models. For example, in 504, for each of the patient models, the processing device 140A (e.g., the matching degree determination module 403, the processing circuits of the processor 210) may determine a matching degree between the patient and the patient model based on the reference interest point(s) in the patient model and the interest point(s) of the patient.

As used herein, a matching degree between the patient and a patient model may measure how similar the posture of the patient is to the reference posture of the reference patient corresponding to the patient model. For example, a higher matching degree between the patient and a patient model may indicate that the posture of the patient is more similar to the reference posture of the reference patient corresponding to the patient model. In some embodiments, the matching degree between the patient and a patient model may be represented by, for example, a number, a level, a rating, or the like. For example, the matching degree may be represented by a fraction in a range of [0,1], wherein "1" indicates the highest matching degree, while "0" indicates the lowest matching degree.

In some embodiments, the processing device 140A may determine the matching degree between the patient and a patient model based on the interest point(s) of the patient and the reference interest point(s) of the patient model. For example, the patient may be represented by a first feature vector including the feature value(s) of the interest point(s). The patient model may be represented by a first reference feature vector including the reference feature value(s) of the first reference interest point(s). The matching degree between the patient and the patient model may have a positive correlation with the extent of similarity (or referred to as a similarity degree) between the first feature vector and the first reference feature vector. A similarity degree between two vectors may be determined based on a similarity algorithm, include a Euclidean distance algorithm, a Manhattan distance algorithm, a Minkowski distance algorithm, a cosine similarity algorithm, a Jaccard similarity algorithm, a Pearson correlation algorithm, or the like, or any combination thereof.

In some embodiments, as described in connection with 503, a patient model may include one or more reference body landmarks representing one or more characteristic regions of the corresponding reference patient. The processing device 140A may determine one or more body landmarks representing one or more characteristic regions of the patient based on the image data of the patient. The body landmark(s) may be determined according to information provided by a user (e.g., a doctor), an image analysis technique, or a combination of the information provided by the user and the image analysis technique. A body landmark may include one or more feature values of one or more features (e.g., a position) of the corresponding characteristic region. The processing device 140A may further determine the matching degree between the patient and a patient model based on a comparison between the interest point(s) and the reference interest point(s) in combination with a comparison between the body landmark(s) and the reference body landmark(s). For example, the patient may be represented by a second feature vector including the feature value(s) of the body landmark(s) and the interest point(s). The patient model may be represented by a second reference feature vector including the reference feature value(s) of the reference body landmark(s) and the reference interest point(s). The matching degree may have a positive correlation with a similarity degree between the second feature vector and the second reference feature vector.

In 505, the processing device 140A (e.g., the posture representation determination module 404, the processing circuits of the processor 210) may determine the posture representation of the patient based on the matching degree between the patient and each patient model.

In some embodiments, the processing device 140A may select a patient model that has the highest matching degree with patient among the patient models. For example, the patient models may be ranked according to their respective matching degrees with the patient from high to low, and the patient model ranked first may be selected. The processing device 140A may designate the reference representation of the reference patient corresponding to the selected patient model as the posture representation of the patient. For brevity, the reference patient corresponding to the selected patient model is referred to as a selected reference patient herein. Alternatively, the processing device 140A may modify the reference representation of the selected reference patient, and designate the modified reference representation as the posture representation of the patient. The modification of the reference representation may be performed according to, for example, the interest point(s) of the patient and the reference interest point(s) of the selected reference patient. Merely by way of example, based on a position difference between an interest point at a left ankle of the patient and a reference interest point at a left ankle of the selected reference patient, the processing device 140A may modify the reference representation by, for example, modifying a parameter value relating to the left ankle the selected reference patient. As another example, the processing device 140A may modify the reference representation based on a transformation relationship between coordinate(s) of the interest point(s) of the patient and coordinate(s) of the reference interest point(s) of the selected reference patient.

In some embodiments, after the selected patient model is determined, the processing device 140A may determine a confidence score of a certain body part of the patient. The confidence score may indicate how accurately a corresponding body part of the selected reference patient matches the certain body part of the patient, which in turn, may indicate a confidence level of a portion of the posture representation corresponding to the certain body part of the patient. For example, a higher confidence score of the abdomen of the patient may indicate that the abdomen of the selected reference patient has a higher matching degree with the abdomen of the patient and the parameter values relating to the abdomen of the patient in the posture representation is more reliable. In some embodiments, the confidence score of a body part of the patient may be associated with various factors including, for example, whether the body part is covered with clothes or not, a similarity degree of the body part with respect to a corresponding body part of the selected reference patient, or the like, or any combination thereof. Merely by way of example, a lower confidence score may be assigned to a region covered by an item (e.g., clothes, a mask, a blanket) compared with a region that is not covered by an item. As another example, compared with a region having a low similarity degree with the corresponding region of the selected reference, a higher confidence score may be assigned to a region having a high similarity degree with the corresponding region of the selected reference patient.

Additionally or alternatively, for each interest point, the processing device 140A may determine a corresponding reference physical point of the selected reference patient that is located at a substantially same position as the interest point. Optionally, a transformation relationship between coordinate(s) of the interest point(s) and coordinate(s) of the corresponding reference physical point(s) may be determined.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 500 may be accomplished with one or more additional operations not described and/or without one or more of the operations discussed above. Additionally, the order of the process 500 may not be intended to be limiting. For example, the operation 503 may be performed before operation 501 or operations 501 and 503 may be performed simultaneously. As another example, operations 504 and 505 may be integrated into a single operation, in which the processing device 140A may determine the representation of the posture of the patient based on a comparison between the interest point(s) of the patient and the reference interest point(s) in each of the plurality of patient models.

In some embodiments, the process 500 may include an additional operation to apply the determined posture representation of the patient in medical imaging, disease diagnosis, treatment planning, or the like, or any combination thereof. In some embodiments, the processing device 140A may generate a scanning plan of the patient based on the posture representation. For example, the processing device 140A may determine a position of a region of interest (ROI) to be scan based on the posture representation, and generate a scanning plan of the ROI based on the position of the ROI. In some embodiments, the processing device 140A may facilitate the adjustment of the position of the patient based on the posture representation. For example, the processing device 140A may compare the position of the patient and a preset position of the patient based on posture representation to determine a set-up error of the patient. The patient or a table on which the patient lies may be directed to move so as to reduce or eliminate the set-up error.

In some embodiments, the processing device 140A may evaluate a treatment plan for the patient based on the posture representation. For example, before a radiotherapy treatment commences, a planning image (e.g., a CT image) of the patient may be acquired by performing a scan on the patient. The radiotherapy treatment may include a plurality of treatment fractions and last for a treatment period of multiple days (e.g., 2 to 5 weeks). The treatment plan, which describes how the radiotherapy treatment is planned to be performed on the patient, may be generated based on the planning image. The image data of the patient described in operation 501 may be acquired before or during a treatment fraction. A posture representation of the patient in the planning image (referred to as a planning posture representation) may be determined by performing exemplary processes for determining a posture representation disclosed in the present disclosure by a computing device (e.g., the processing device 140A). The processing device 140A may determine a difference between the posture representation of the patient and the planning posture representation to identify a posture change between the time of planning and the time of the delivery of the treatment fraction. If the posture change is greater than a threshold, the patient or a table on which the patient lies may be directed to move to compensate the posture change. Alternatively, the treatment plan (e.g., a therapeutic dose) may be modified in order to reduce toxicity to portions of the patient by unintended radiation and improve the accuracy of the radiation delivery to the target and overall outcome of the treatment.

Figure 6:
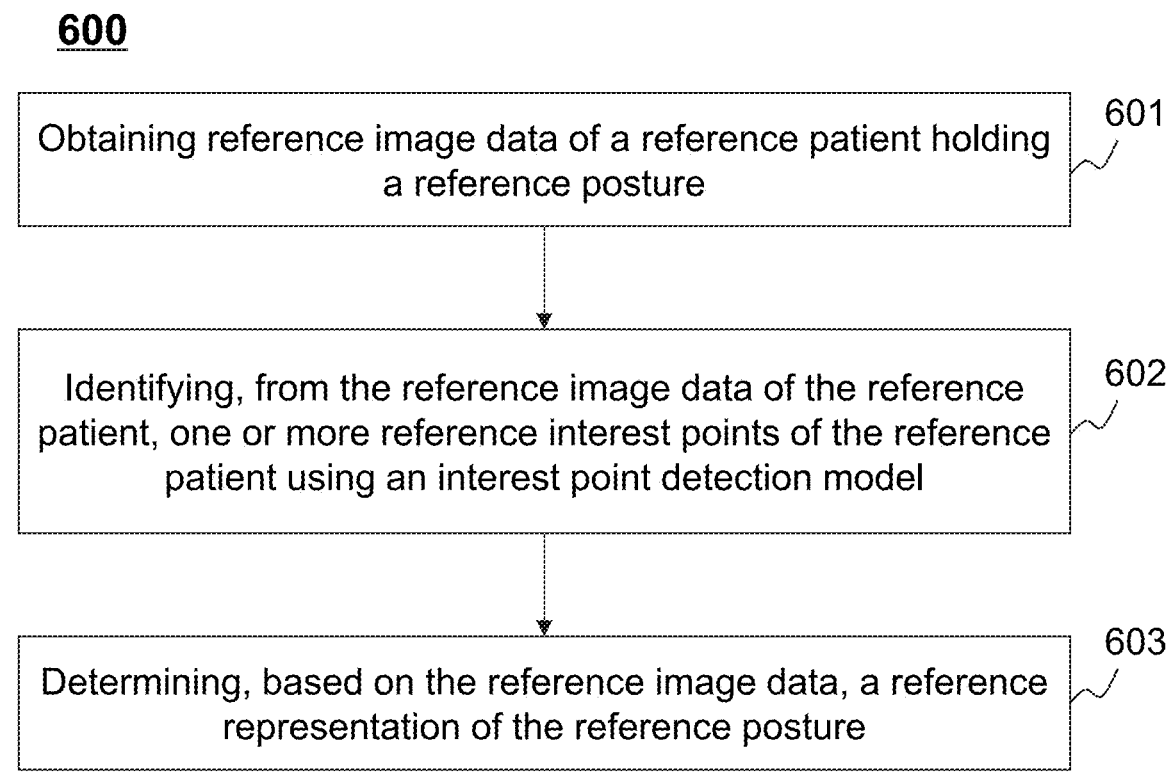
FIG. 6 is a flowchart illustrating an exemplary process for generating a patient model representing a reference patient holding a reference posture according to some embodiments of the present disclosure.

FIG. 6 is a flowchart illustrating an exemplary process for generating a patient model representing a reference patient holding a reference posture according to some embodiments of the present disclosure. In some embodiments, process 600 may be executed by the imaging system 100. For example, the process 600 may be implemented as a set of instructions (e.g., an application) stored in a storage device (e.g., the storage device 150, the storage 220, and/or the storage 390). The processing device 140 (e.g., the processor 210 of the computing device 200, the CPU 340 of the mobile device 300, the processing device 140A illustrated in FIG. 4A, the processing device 140B illustrated in FIG. 4B) may execute the set of instructions and may accordingly be directed to perform the process 600. Alternatively, the process 600 may be performed by a computing device of a system of a vendor that provides and/or maintains such patient model, wherein the system of the vendor is different from the imaging system 100. For illustration purposes, the following descriptions are described with reference to the implementation of the process 600 by the processing device 140A, and not intended to limit the scope of the present disclosure.

In 601, the processing device 140A (e.g., the acquisition module 401, the interface circuits of the processor 210) may obtain reference image data of the reference patient holding a reference posture.

The reference image data of the reference patient may refer to image data of the reference patient holding the reference posture. The reference image data may include one or more 2D image, a 3D image, a 4D image, and/or any related image data (e.g., scan data, projection data, etc.). For example, the reference image data may include color image data, point-cloud data, depth image data, mesh data, medical image data, or the like, or any combination thereof, of the reference patient. In some embodiments, the reference image data may be of the same type as the image data of the patient described in 501. For example, both of the image data and the reference image data may be depth image data. Alternatively, the reference image data may be of a different type from the image data of the patient. The reference image data may be transformed to transformed image data of the same type as the image data of the patient. For example, if the image data is a 2D image of the patient and the reference image data is a 3D image of the reference patient, the reference image data may be transformed into a 2D image by, for example, performing a projection on the reference image data.

In some embodiments, the reference patient may be a real human or a phantom representing a human holding the reference posture. The reference image data may include actual scanning data which is acquired by performing a scan the reference patient using an image acquisition device (e.g., the medical imaging device 110, the image acquisition device 160, or an external image acquisition device). Alternatively, the processing device 140A may acquire initial scanning data of the reference patient holding an initial posture different from the reference posture. The processing device 140A may transform the representation of the posture of the reference patient in the initial scanning data to a representation of the reference posture by, for example, translating or rotating the representation of the reference patient (or a portion thereof), so as to generate the reference image data. In some embodiments, the reference patient may be a virtual human model holding the reference posture, and the reference image data may be simulated image data (e.g., a simulated 3D model) of the virtual human model.

In 602, the processing device 140A (e.g., the identification module 402, the processing circuits of the processor 210) may identify one or more reference interest points of the reference patient from the reference image data of the reference patient using the interest point detection model. For example, the reference image data may be inputted into the interest point detection model, and the interest point detection model may output the reference interest point(s) of the reference patient.

In 603, the processing device 140A (e.g., the posture representation determination module 404, the processing circuits of the processor 210) may determine the reference representation of the reference posture based on the reference image data.

Figure 7:
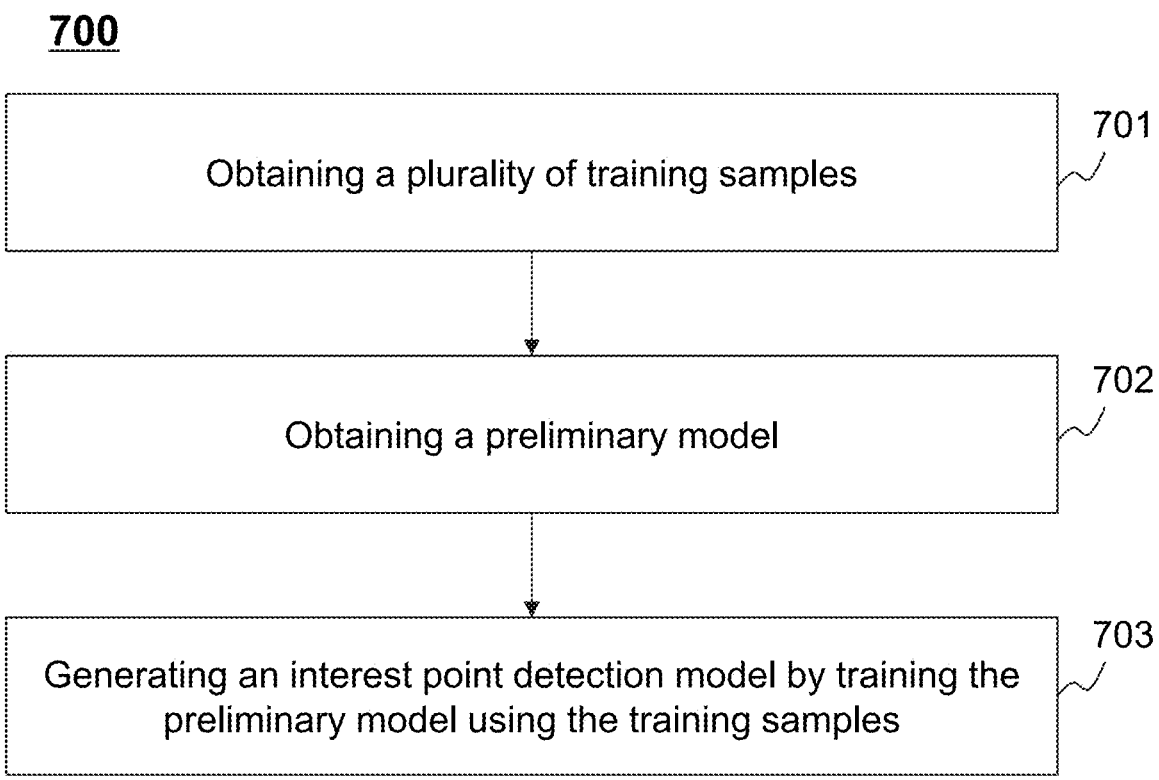
FIG. 7 is a flowchart illustrating an exemplary process for generating an interest point detection model according to some embodiments of the present disclosure.

In some embodiments, the reference image data may be inputted into a posture representation determination model as described elsewhere in this disclosure (e.g., FIG. 7 and the relevant descriptions). The posture representation determination model may output the reference representation. Alternatively, the reference representation may be determined according to an image analysis technique. Merely by way of example, the processing device 140A may utilize an image segmentation technique to segment the reference patient and/or one or more ROIs (e.g., the abdomen, the chest, and/or the limbs) of the reference patient from the reference image data. The processing device 140A may further determine one or more parameter values relating to reference posture (e.g., the position, the pose, the shape, and/or the size) of the reference patient and/or the ROIs. The determined parameter value(s) may be used to construct the reference representation of the reference posture. In some embodiments, the reference image data of the reference patient may be obtained by transforming initial scanning data (or referred to as initial image data) of the reference patient holding an initial posture as described above. The processing device 140A may determine the reference representation of the reference posture based on the representation of the initial posture. For example, if the reference image data is generated by rotating the representation of the right wrist of the reference patient in the initial scanning data, the processing device 140A may generate the reference representation by modifying a value of the joint angle of the right wrist in the representation of the initial posture.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 600 may be accomplished with one or more additional operations not described and/or without one or more of the operations discussed above. Additionally, the order of the process 600 may not be intended to be limiting. For example, the operation 603 may be performed before operation 602 or operations 602 and 603 may be performed simultaneously.

FIG. 7 is a flowchart illustrating an exemplary process for generating an interest point detection model according to some embodiments of the present disclosure. In some embodiments, process 700 may be executed by the imaging system 100. For example, the process 700 may be implemented as a set of instructions (e.g., an application) stored in a storage device (e.g., the storage device 150, the storage 220, and/or the storage 390). The processing device 140B (e.g., the processor 210 of the computing device 200, the CPU 340 of the mobile device 300, and/or one or more modules illustrated in FIG. 4B) may execute the set of instructions and may accordingly be directed to perform the process 700. Alternatively, the process 700 may be performed by a computing device of a system of a vendor that provides and/or maintains such interest point detection model, wherein the system of the vendor is different from the imaging system 100. For illustration purposes, the following descriptions are described with reference to the implementation of the process 700 by the processing device 140B, and not intended to limit the scope of the present disclosure.

In 701, the processing device 140B (e.g., the acquisition module 405, the interface circuits of the processor 210) may obtain a plurality of training samples.

Each training sample may include sample image data of a sample patient holding a first posture and a representation of the first posture (also referred to as a first posture representation for brevity). As used herein, sample image data of a sample patient may refer to image data of the sample patient that is used in training the interest point detection model. For example, the sample image data of a sample patient may include a 2D image, point-cloud data, a 3D model (e.g., a mesh model), color image data, depth image data, or medical image data of the sample patient. The sample image data of each training sample may have no annotation regarding interest points of the sample patient. In some embodiments, the sample patient in each training sample may have a body exposed or visible without being covered by an item (e.g., clothes) or otherwise being covered by an item.

In some embodiments, the interest point detection model may be used to identify one or more interest points in image data of a patient. The sample image data in each training sample may be of the same type or different types. For example, if the interest point detection model is used to identify interest point(s) in a CT image, the sample image data in a training sample may also include a CT image. As another example, if the interest point detection model is used to identify interest point(s) in a 2D image, the sample image data in a training sample may be a 3D image and need to be converted into a 2D image by, e.g., projection.

In some embodiments, the sample image data of a sample patient holding a first posture may be obtained in a similar manner as obtaining reference image data of a reference patient of a patient model as described in connection with FIG. 6. The first posture representation of the sample patient may be determined in a similar manner as determining a reference representation of a reference patient of a patient model as described in connection with FIG. 6. For example, the sample image data may be actual scanning data or simulated image data of the sample patient, and the first posture representation may be determined based on the sample image data using an image analysis technique or a posture representation determination model. As another example, the sample image data may be transformed from scanning data of the sample patient holding an initial posture different from the first posture. The processing device 140B may obtain a representation of the initial posture and determine the first posture representation by modifying the obtained representation.

In 702, the processing device 140B (e.g., the acquisition module 405, the interface circuits of the processor 210) may obtain a preliminary model.

In 703, the processing device 140B (e.g., the model generation module 406, the processing circuits of the processor 210) may generate the interest point detection model by training the preliminary model using the training samples. In some embodiments, the preliminary model may be trained according to a machine learning algorithm as described elsewhere in this disclosure (e.g., operation 502 and the relevant descriptions).

Figure 9:
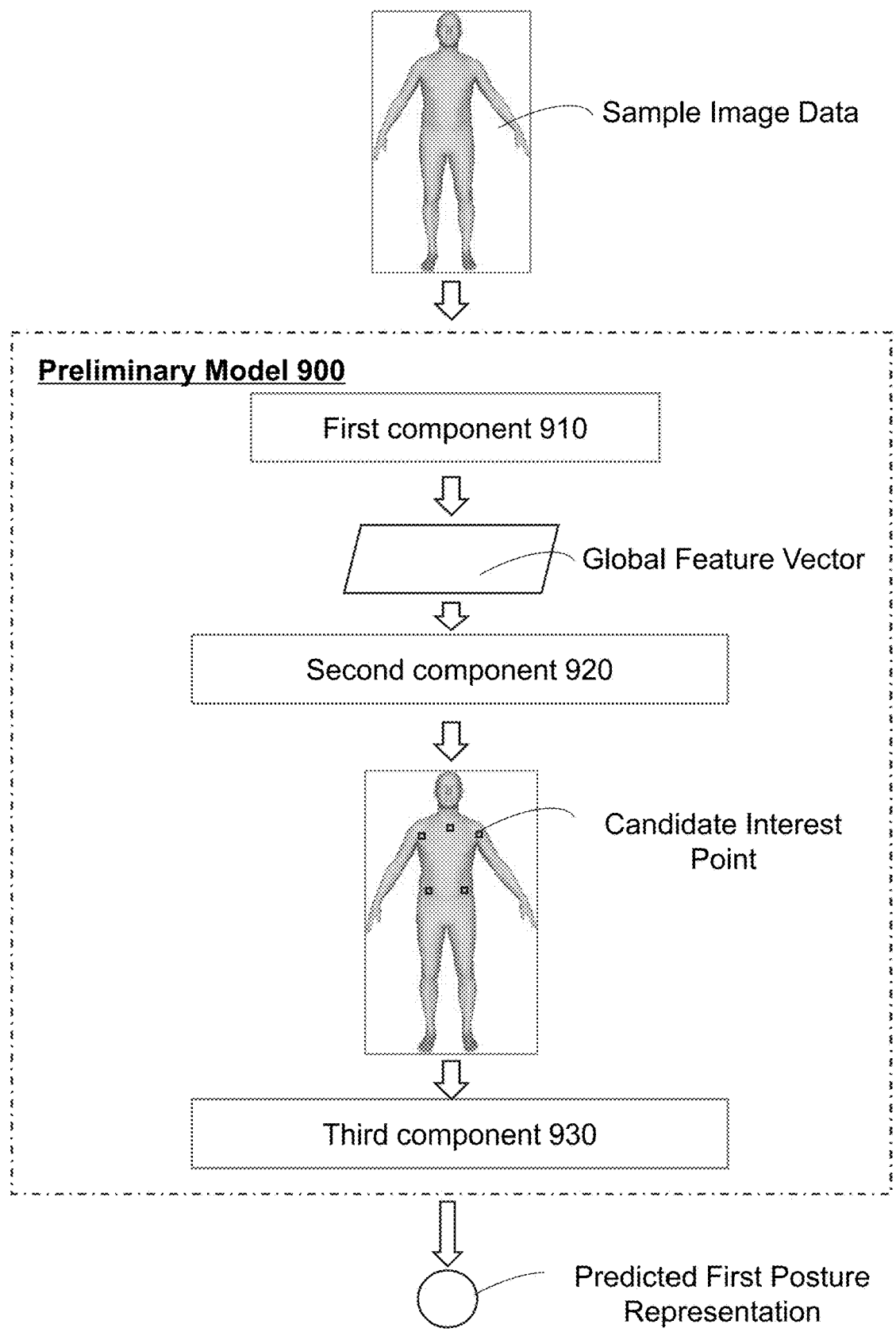
FIG. 9 is a schematic diagram illustrating an exemplary preliminary model according to some embodiments of the present disclosure.

In some embodiments, the preliminary model may be a preliminary model 900 as illustrated in FIG. 9. The processing device 1406 may train the preliminary model 900 using the training samples to generate a posture representation determination model. The processing device 1406 may designate a portion of the posture representation determination model as the interest point detection model. As illustrated in FIG. 9, the preliminary model 900 may include a first component 910, a second component 920, and a third component 930. For a training sample, the first component 910 may be configured to extract a global feature vector from the sample image data of the training sample. The global feature vector of sample image data may include one or more features (e.g., a shape feature, a contour feature, a texture feature, a complicated feature) of the whole sample image data. The second component 920 may be configured to identify a plurality of candidate interest points in the sample image data of the training sample based on the global feature vector of the training sample. A candidate interest point may also be referred to as an image patch of the sample image data and have one or more local features. The third component 930 may be configured to determine a predicted representation of the first posture (also referred to as a predicted first representation for brevity) of the sample patient corresponding to the training sample based on the candidate interest points of the training sample.

In some embodiments, the first component 910, the second component 920, and the third component 930 may be any neural network component that can realize their respective functions. Merely by way of example, the first component 910 may be a convolutional neural network (CNN), a random forest network, or any neural network component for feature extraction. The second component 920 may be a region proposal network (RPN). The third component 930 may be a fully connected network layer.

In some embodiments, the preliminary model 900 may include one or more model parameters having one or more initial values before model training. The training of the preliminary model 900 may include one or more first iterations. For illustration purposes, the following descriptions are described with reference to a current first iteration. In the current first iteration, the processing device 140B may input the sample image data of each training sample into the preliminary model 900 in the current first iteration to obtain a predicted first representation of the first posture of the sample patient. The processing device 140B may determine a value of a first loss function based on the actual representation and the predicted first representation corresponding to the first posture of each training sample. The first loss function may be used to measure a difference between the actual representation and the predicted first representation of each training sample. The processing device 1406 may determine whether the first termination condition is satisfied in the current first iteration. An exemplary first termination condition may be that the value of the first loss function obtained in the current first iteration is less than a first predetermined threshold. Other exemplary first termination conditions may include that a certain count of first iterations is performed, that the first loss function converges such that the differences of the values of the first loss function obtained in consecutive first iterations are within a threshold, etc. In response to a determination that the first termination condition is satisfied in the current first iteration, the processing device 1406 may designate the first component 910 and the second component 920 of the preliminary model 900 in the current first iteration as the interest point detection model. Optionally, the processing device 140B may designate the preliminary model 900 in the current first iteration as the posture representation determination model. Additionally or alternatively, the processing device 1406 may further store the interest point detection model and/or posture representation determination model into a storage device (e.g., the storage device 150, the storage 220, and/or the storage 390) of the imaging system 100 and/or output the model(s) for further use (e.g., in process 500 and/or process 600).

If the first termination condition is not satisfied in the current first iteration, the processing device 1406 may update the preliminary model 900 in the current first iteration and proceed to a next first iteration. For example, the processing device 140B may update the value(s) of the model parameter(s) of the preliminary model 900 based on the value of the first loss function according to, for example, a backpropagation algorithm. The processing device 140B may designate the updated preliminary model 900 in the current first iteration as a preliminary model 900 in a next first iteration. The processing device 140B may perform the next first iteration until the first termination condition is satisfied. After the first termination condition is satisfied in a certain first iteration, a portion of the preliminary model 900 (e.g., a trained first component and a trained second component corresponding to the first component 910 and the second component 920, respectively) in the certain first iteration may be designated as the interest point detection model.

Figure 10:
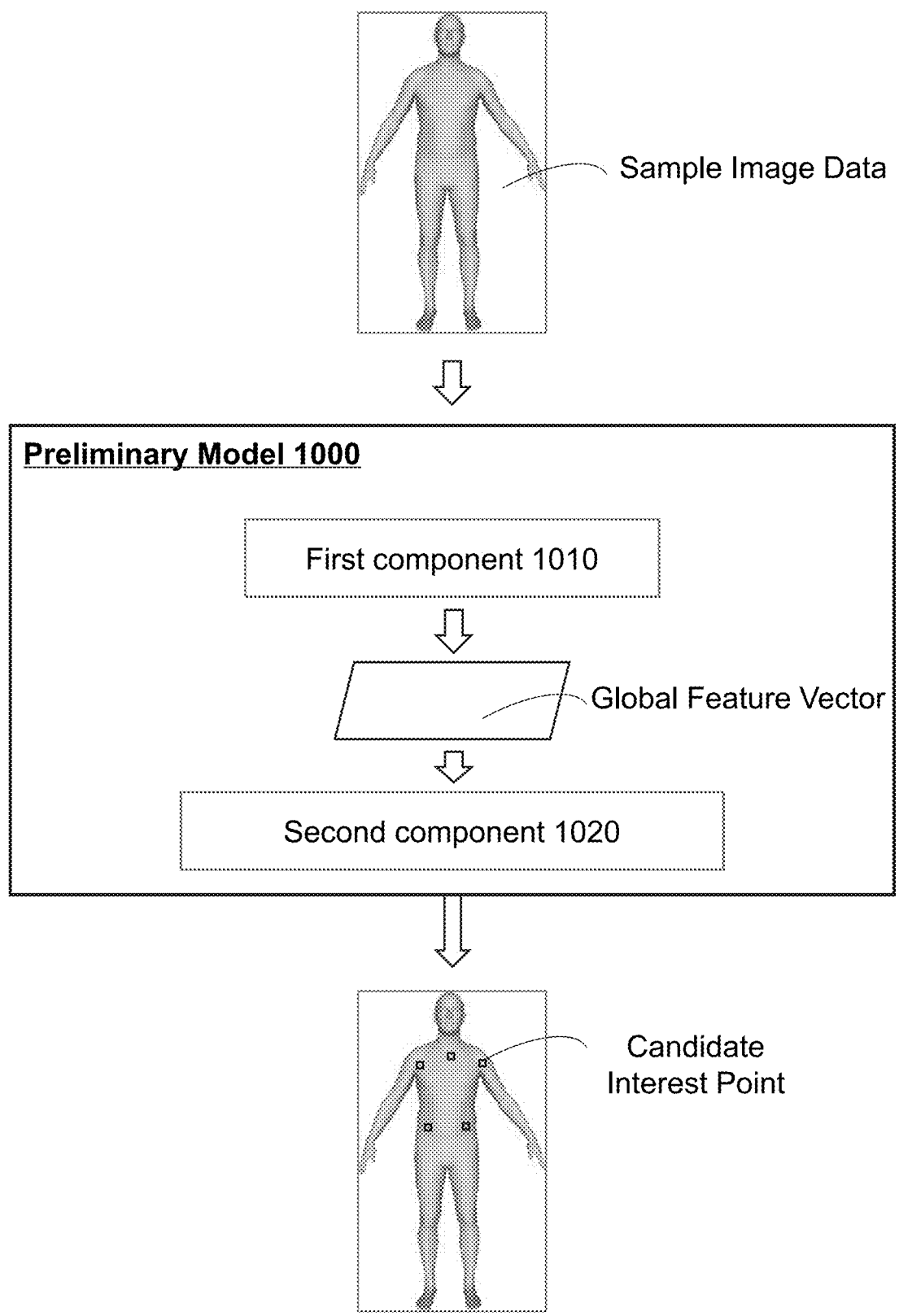
FIG. 10 is a schematic diagram illustrating another exemplary preliminary model according to some embodiments of the present disclosure.

In some embodiments, the preliminary model may be a preliminary model 1000 as illustrated in FIG. 10. The processing device 140B may train the preliminary model 1000 using the training sample to generate a trained model and designate the trained model as the interest point detection model. As illustrated in FIG. 10, the preliminary model 1000 may include a first component 1010 and a second component 1020. The first component 1010 and the second component 1020 may have functions the same as or similar to the first component 910 and the second component 920 of the preliminary model 900, respectively.

In some embodiments, the preliminary model 1000 may include one or more model parameters having one or more initial values before model training. In the training of the preliminary model 1000, the value(s) of the model parameter(s) of the preliminary model 1000 may be updated. In some embodiments, the training of the preliminary model 1000 may include one or more iterations. For illustration purposes, a current iteration of the iteration(s) is described in the following description. The current iteration may include one or more operations of process 800 illustrated in FIG. 8.

In 801, for each training sample, the processing device 140B (e.g., the model generation module 406, the processing circuits of the processor 210) may identify a plurality of first candidate interest points of the corresponding sample patient from the corresponding sample image data using the preliminary model 1000 in the current iteration. For example, for a training sample, the corresponding sample image data may be inputted into the preliminary model 1000 in the current iteration to generate the first candidate interest points. A first candidate interest point may include one or more feature values relating to one or more features (e.g., a position, a texture feature, a complicated feature, etc.) of the first candidate interest point.

In 802, for each training sample, the processing device 140B (e.g., the model generation module 406, the processing circuits of the processor 210) may generate transformed image data of the corresponding sample patient holding a second posture by transforming the representation of the posture of the corresponding sample patient from the first posture to the second posture. For example, for a training sample, the processing device 140B may translate and/or rotate the representation of the sample patient in the sample image data of the training sample from the first posture to the second posture, so as to generate the transformed image data of the training sample. In some embodiments, the sample image data of a training sample may include a 3D model (e.g., a mesh model) of a sample patient. The processing device 140B may generate transformed image data of the training sample by rotating the representation of the sample patient in the 3D space, for example, from a front view to a side view of the sample patient. In other words, the transformed image data may be generated by rendering the 3D model from a viewpoint different from that of the original sample image data. The rendering of the 3D model may generate a rendered 3D projection of the 3D model from a different viewpoint. In some embodiments, the transformed image data may be the rendered 3D projection itself. Alternatively, the transformed image data may be a depth image generated based on the rendered 3D projection from a different viewpoint.

In 803, for each training sample, the processing device 140B (e.g., the model generation module 406, the processing circuits of the processor 210) may identify a plurality of second candidate interest points of the corresponding sample patient from the transformed image data of the training sample.

An identified second candidate interest point of a training sample may correspond to one of the first candidate interest points of the training sample. As used herein, a second candidate interest point may be regarded as being corresponding to a first candidate interest point if the first and second candidate interest points are located at the same position or substantially same positions of a sample patient. For example, for a first candidate interest point located on the nose of a sample patient, a point on the nose of the sample patient in the transformed image data may be identified and regarded as a second candidate interest point corresponding to the first candidate interest point. A second candidate interest point of a training sample may include one or more feature values relating to one or more features (e.g., a position, a texture feature, a complicated feature, etc.). In some embodiments, only a portion of the first candidate interest points of a training sample may have corresponding second candidate interest points in the transformed image data of the training sample. For example, a first candidate interest point is located at the left leg of the sample patient of the training sample and the left leg may be invisible in the transformed image data. Such first candidate interest point may have no corresponding second candidate interest point.

In some embodiments, the second candidate interest points of a training sample and/or the feature values of the second candidate interest points may be determined by analyzing the transformed image data. Alternatively, the transformed image data of the training sample may be inputted into the preliminary model 1000 in the current iteration, and the preliminary model 1000 in the current iteration may output the second candidate interest points and their feature values.

In 804, the processing device 140B (e.g., the model generation module 406, the processing circuits of the processor 210) may determine a value of a second loss function based on the first candidate interest points and the second candidate interest points of each training sample.

In some embodiments, the second loss function may be associated with a difference between the feature values of the first and second candidate interest points of each training sample. For example, for each training sample, a similarity measure between a feature vector including feature values of the first candidate interest points and a feature vector including feature values of the second candidate interest points may be determined. The second loss function may have a certain correlation (e.g., a negative correlation) with the determined similarity degrees of the training samples. In some embodiments, the second loss function may be a contrastive objective function. In some embodiments, the second loss function may encourage the preliminary model 1000 to identify an interest point in image data that has a viewpoint invariant characteristic. As used herein, if a certain interest point can be easily identified in image data rendered from different viewpoints and have substantially same feature values in the image data rendered from different viewpoints, the certain interest point may be regarded as having a viewpoint invariant characteristic. Merely by way of example, a 3D model of a patient may be rendered from different viewpoints, if an interest point located on a nose of the patient can be easily identified in the rendered projections (or depth maps corresponding to the rendered 3D projections) and has substantially same feature values in the rendered 3D projections (or the depth maps corresponding to the rendered 3D projections), the interest point located on the nose may be regarded as having a viewpoint invariant characteristic. Compared with an interest point without a viewpoint invariant characteristic, an interest point having a viewpoint invariant characteristic may be more reliable and representative, which, in turn, may improve the accuracy of patient positioning.

In 805, the processing device 140B (e.g., the model generation module 406, the processing circuits of the processor 210) may determine whether a second termination condition is satisfied in the current iteration.

Exemplary second termination conditions may include that the value of the second loss function obtained in the current iteration is less than a second predetermined threshold, that a certain count of iterations are performed, that the second loss function converges such that the differences of the values of the second loss function obtained in consecutive iterations are within a threshold, etc.

In 806, in response to a determination that the second termination condition is satisfied in the current iteration, the processing device 140B (e.g., the model generation module 406, the processing circuits of the processor 210) may designate the preliminary model 1000 in the current iteration as the interest point detection model. Additionally or alternatively, the processing device 1406 may further store the interest point detection model into a storage device (e.g., the storage device 150, the storage 220, and/or the storage 390) of the imaging system 100 and/or output the interest point detection model for further use, for example, in determining a posture representation of a patient (e.g., in process 500 as described in connection with FIG. 5) or obtaining a patient model (e.g., in process 600 as described in connection with FIG. 6).

In 807, in response to a determination that the second termination condition is not satisfied in the current iteration, the processing device 140B may update the preliminary model 1000. The processing device 140B may update the preliminary model 1000 in the current iteration and proceed to a next iteration. For example, the processing device 1406 may update the value(s) of the model parameter(s) of the preliminary model 1000 according to, for example, a backpropagation algorithm. The processing device 140B may designate the updated preliminary model 1000 in the current iteration as a preliminary model 1000 in a next iteration. The processing device 1406 may perform the next iteration until the second termination condition is satisfied. After the second termination condition is satisfied in a certain iteration, the preliminary model 1000 in the certain iteration may be designated as the interest point detection model.

It should be noted that the above descriptions regarding the process 700 and process 800 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the order of the process 700 and/or the process 800 may not be intended to be limiting. For example, the operation 702 may be performed before operation 701 or operations 701 and 702 may be performed simultaneously.

Additionally or alternatively, the process 700 and/or the process 800 may be accomplished with one or more additional operations not described and/or without one or more of the operations discussed above. For example, the processing device 1406 may further test the interest point detection model using a set of testing samples to determine whether a testing condition is satisfied. If the testing condition is not satisfied, the process 700 may be performed again to further train the preliminary model. In some embodiments, a testing image of a patient with a representation of body landmarks of characteristic regions of the patient may be used to test the interest point detection model. For example, the processing device 140B may use the interest point detection model to identify interest points of the testing image and compare the identified interest points with the known body landmarks of the testing image. If a difference between the identified interest points and the known body landmarks is greater than a first threshold, the process 700 may be performed again to further train the preliminary mode. As another example, the processing device 140B may determine a posture representation of the patient in the testing image based on the interest point detection model and the known body landmarks, respectively. The processing device 1406 may compare the posture representations and perform 700 again to further train the preliminary model if the difference between the posture representations is greater than a second threshold. In some embodiments, before training the preliminary using the sample image data, the processing device 140B may perform a preprocessing operation, such as image segmentation, image enhancement on the sample image data of the training samples (or a portion thereof).

Figure 11:
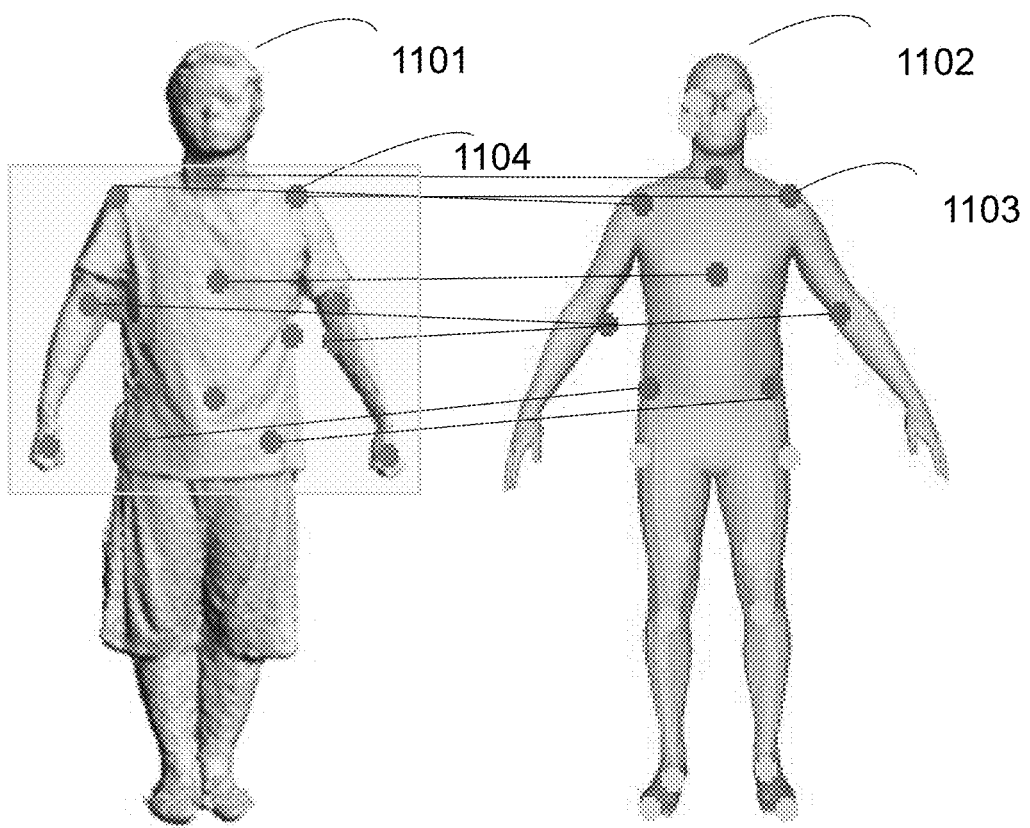
FIG. 11 is a schematic diagram illustrating an exemplary 3D model of a patient and an exemplary patient model according to some embodiments of the present disclosure.

FIG. 11 is a schematic view illustrating an exemplary 3D model 1101 of a patient and an exemplary patient model 1102 according to some embodiments of the present disclosure. As shown in FIG. 11, the 3D model 1101 includes a plurality of interest points 1104. In some embodiments, the interest points 1104 may be identified using an interest point detection model as described elsewhere in this disclosure (e.g., FIG. 5 and the relevant descriptions). The patient model 1102 includes a plurality of reference interest points 1103 (represented by a plurality of spots in the patient model 1102).

In some embodiments, the 3D model 1101 may be matched with the patient model 1102. For example, as illustrated in FIG. 11, a plurality of matching pairs of interest points are determined. Each matching pair may include an interest point in the 3D model 1101 and a reference interest point in the patient model 1102, wherein the interest point and the reference interest point may have same or similar feature values (e.g., positions) and match each other. For illustration purposes, the reference interest points of the matching pairs are represented by dark grey spots and other reference interest points are represented by light grey spots in the patient model 1102. Optionally, a confidence score may be determined for a body part of the patient in the 3D model 1101 to indicate a matching degree of the body part with a corresponding body part of the patient model 1102. For example, a higher confidence score may be assigned to the body part where the interest points of the matching pairs locate (indicated by a bounding box in FIG. 10), while a lower confidence score may be assigned to the head and the lower part of the patient.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for patient positioning, comprising:
at least one storage device including a set of instructions; and
at least one processor configured to communicate with the at least one storage device, wherein when executing the set of instructions, the at least one processor is configured to direct the system to perform operations including:
acquiring image data relating to a patient holding a posture;
identifying at least one interest point of the patient from the image data using an interest point detection model;
determining at least one body landmark representing at least one characteristic region of the patient according to information provided by a user;
acquiring a plurality of patient models, each patient model representing a reference patient holding a reference posture, and including at least one reference interest point of the reference patient, at least one reference body landmark of the reference patient, and a reference representation of the reference posture; and
determining, based on a comparison between the at least one interest point of the patient and the at least one reference interest point in each of the plurality of patient models in combination with a comparison between the at least one body landmark of the patient and the at least one reference body landmark in each of the plurality of patient models, a representation of the posture of the patient, wherein the interest point detection model is generated by:
obtaining a plurality of training samples, each training sample including sample image data of a sample patient holding a first posture and a representation of the first posture;
obtaining a preliminary model;
generating a posture representation determination model by training the preliminary model using the training samples according to a machine learning algorithm, the posture representation determination model being used to receive first image data of a first subject and output a representation of a posture of the first subject based on the first image data; and designating a portion of the posture representation determination model as the interest point detection model, the interest point detection model being used to receive second image data of a second subject and output interest points of the second subject based on the second image data.

2. The system of claim 1, wherein to determine a representation of the posture of the patient, the at least one processor is further configured to direct the system to perform additional operations including:

for each of the patient models, determining, based on the at least one reference interest point in the patient model and the at least one interest point of the patient, a matching degree between the patient and the patient model;

selecting, among the patient models, a patient model that has a highest matching degree with the patient; and designating the reference representation corresponding to the selected patient model as the representation of the posture of the patient.

3. The system of claim 2, wherein the matching degree between the patient and each patient model is determined based further on the at least one body landmark of the patient and the at least one reference body landmark of the patient model.

4. The system of claim 1, wherein the sample image data of each training sample has no annotation regarding interest points on the corresponding sample patient.

5. The system of claim 1, the at least one processor is further configured to direct the system to perform additional operations including:

for each of the reference patients,
obtaining reference image data of the reference patient holding a reference posture;
identifying, from the reference image data of the reference patient, the at least one reference interest point of the reference patient using the interest point detection model; and
determining, based on the reference image data, the reference posture of the reference patient.

6. The system of claim 1, the at least one processor is further configured to direct the system to perform additional operations including at least one of:

generating, based on the representation of the posture, a scanning plan of the patient;
facilitating, based on the representation of the posture, an adjustment of a position of the patient; or
evaluating, based on representation of the posture, a treatment plan for the patient.

7. The system of claim 1, wherein the image data relating to the patient includes at least one of color image data, point-cloud data, depth image data, mesh data, or medical image data.

8. The system of claim 1, wherein the posture of the patient is represented by one or more parameters relating to at least one of a position, a pose, a shape, or a size of the patient.

9. The system of claim 1, wherein at least a portion of the patient in the image data is covered by an item.

10. The system of claim 1, wherein the interest point detection model includes:

a first component configured to extract a global feature vector from the image data; and
a second component configured to identify, based on the global feature vector of the image data, the at least one interest point of the patient.

11. The system of claim 10, wherein the interest point detection model is part of a posture representation determination model.

12. A system for generating an interest point detection model, comprising:

at least one storage device storing a set of instructions; and
at least one processor configured to communicate with the at least one storage device, wherein when executing the set of instructions, the at least one processor is configured to direct the system to perform operations including:

obtaining a plurality of training samples, each training sample including sample image data of a sample patient holding a first posture and a representation of the first posture;
obtaining a preliminary model; and
generating the interest point detection model by training the preliminary model using the training samples, wherein the generating the interest point detection model by training the preliminary model using the training samples comprises:

generating a posture representation determination model by training the preliminary model using the training samples according to a machine learning algorithm, the posture representation determination model being used to receive first image data of a first subject and output a representation of a posture of the first subject based on the first image data; and
designating a portion of the posture representation determination model as the interest point detection model, the interest point detection model being used to receive second image data of a second subject and output interest points of the second subject based on the second image data.

13. The system of claim 12, wherein the training the preliminary model using the training samples comprises one or more iterations, each current iteration of the one or more iteration comprises:

for each training sample corresponding to a sample patient,
identifying, from the corresponding sample image data, a plurality of first candidate interest points of the corresponding sample patient using the preliminary model in the current iteration;
generating transformed image data of the corresponding sample patient holding a second posture by transforming the posture of the corresponding sample patient from the first posture to the second posture; and
identifying, from the transformed image data of the training sample, a plurality of second candidate interest points of the corresponding sample patient, each second candidate interest point corresponding to one of the plurality of first candidate interest points;
determining, based on the plurality of first candidate interest points and the second candidate interest points of each training sample, a value of a loss function;

determining whether a termination condition is satisfied in the current iteration; and in response to a determination that the termination condition is satisfied in the current iteration, designing the preliminary model in the current iteration as the interest point detection model.

14. The system of claim 12, wherein the training the preliminary model using the training samples comprises one or more iterations, each current iteration of the one or more iterations comprises:

for each training sample, determining, based on the corresponding sample image data, a predicted representation of the first posture of the corresponding sample patient using the preliminary model in the current iteration;

determining, based on the representation and the predicted representation corresponding to each training sample, a value of a loss function;

determining, based on the value of the loss function, whether a termination condition is satisfied in the current iteration; and in response to a determination that the termination condition is satisfied in the current iteration, designing a portion of the preliminary model in the current iteration as the interest point detection model.

15. The system of claim 12, wherein the preliminary model comprises:

a first component configured to extract a global feature vector from the sample image data of a first training sample; and a second component configured to identify, based on the global feature vector of the first training sample, a plurality of candidate interest points in the sample image data of the first training sample.

16. The system of claim 15, wherein the preliminary model further comprises:

a third component configured to determine, based on the candidate interest points of the first training sample, a predicted representation of the first posture of the sample patient corresponding to the first training sample.

17. The system of claim 12, wherein the sample image data of each training sample includes at least one of point-cloud data, a three-dimensional (3D) model, or a mesh model of the corresponding sample patient.

18. The system of claim 12, wherein the plurality of training samples includes a first training sample corresponding to a first sample patient, and to obtain a plurality of training samples, the at least one processor is further configured to direct the system to perform additional operations including:

obtaining initial image data of the first sample patient holding an initial posture and a representation of the initial posture;

transforming the posture of the first sample patient in the initial image data from the initial posture to a transformed posture to obtain transformed image data of the first sample patient holding the transformed posture;

determining, based on the representation of the initial posture, a representation of the transformed posture; and generating the first training sample including the transformed image data corresponding to the transformed posture of the first sample patient.

19. A method for patient positioning implemented on a computing device having at least one processor and at least one storage device, the method comprising:

acquiring image data relating to a patient holding a posture;

identifying at least one interest point of the patient from the image data using an interest point detection model;

determining at least one body landmark representing at least one characteristic region of the patient according to information provided by a user;

acquiring a plurality of patient models, each patient model representing a reference patient holding a reference posture, and including at least one reference interest point of the referent patient, at least one reference body landmark of the reference patient, and a reference representation of the reference posture; and determining, based on a comparison between the at least one interest point of the patient and the at least one reference interest point in each of the plurality of patient models in combination with a comparison between the at least one body landmark of the patient and the at least one reference body landmark in each of the plurality of patient models, a representation of the posture of the patient, wherein the interest point detection model is generated by:

obtaining a plurality of training samples, each training sample including sample image data of a sample patient holding a first posture and a representation of the first posture;

obtaining a preliminary model;

generating a posture representation determination model by training the preliminary model using the training samples according to a machine learning algorithm, the posture representation determination model being used to receive first image data of a first subject and output a representation of a posture of the first subject based on the first image data; and designating a portion of the posture representation determination model as the interest point detection model, the interest point detection model being used to receive second image data of a second subject and output interest points of the second subject based on the second image data.

20. The method of claim 19, wherein the determining a representation of the posture of the patient comprises:

for each of the patient models, determining, based on the at least one reference interest point in the patient model and the at least one interest point of the patient, a matching degree between the patient and the patient model;

selecting, among the patient models, a patient model that has a highest matching degree with the patient; and designating the reference representation corresponding to the selected patient model as the representation of the posture of the patient.

* * * * *